US010051782B2

United States Patent
Wilhelmi et al.

(10) Patent No.: US 10,051,782 B2
(45) Date of Patent: Aug. 21, 2018

(54) ROW UNIT FOR AN AGRICULTURAL PLANTING IMPLEMENT

(71) Applicant: Kinze Manufacturing, Inc., Williamsburg, IA (US)

(72) Inventors: Matthew J. Wilhelmi, Parnell, IA (US); Dustan Hahn, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 39 days.

(21) Appl. No.: 15/229,303

(22) Filed: Aug. 5, 2016

(65) Prior Publication Data

US 2017/0034995 A1    Feb. 9, 2017

Related U.S. Application Data

(60) Provisional application No. 62/202,539, filed on Aug. 7, 2015.

(51) Int. Cl.
*A01C 7/20* (2006.01)
*A01C 5/06* (2006.01)
(Continued)

(52) U.S. Cl.
CPC .............. *A01C 7/203* (2013.01); *A01C 5/062* (2013.01); *A01C 7/046* (2013.01); *A01C 7/20* (2013.01); *A01C 21/005* (2013.01)

(58) Field of Classification Search
CPC .. A01C 5/06; A01C 7/08; A01C 5/062; A01C 7/042; A01C 7/081; A01C 7/082;
(Continued)

(56) References Cited

U.S. PATENT DOCUMENTS

| 3,188,988 | A | * | 6/1965 | Peck | ............... A01C 23/02 111/125 |
| 3,797,418 | A | * | 3/1974 | Bridger, Jr. | ............ A01C 5/06 111/140 |

(Continued)

FOREIGN PATENT DOCUMENTS

| CA | 2871859 A1 * | 5/2015 | ............... A01C 7/06 |
| EP | 2747541 A1 | 7/2014 | |

(Continued)

OTHER PUBLICATIONS

Kinze Manufacturing, Inc., PCT/US2016/045759 filed Aug. 5, 2016, "International Search Report and the Written Opinion of the International Searching Authority" dated Oct. 20, 2016, 16 pages.

*Primary Examiner* — John Weiss
(74) *Attorney, Agent, or Firm* — McKee, Voorhees & Sease, PLC

(57) ABSTRACT

A row unit for use with a planter includes a furrow creator and an apparatus for controlling the depth of furrow created. The furrow creator can be a blade and shank. A seed meter, for example, a positive pressure meter, can be included that provides precision planting of one or more particulates. The seed meter can be a single meter or can include more than one meter at each row unit, such as to provide for multi-hybrid or multi-particulate planting. The positive pressure can then be used to delivering the seed via a seed to ground device to plant the one or more particulates in the created furrow. The row unit as provided will be a more precise planting for both seed spacing and depth, as well as other planting characteristics.

18 Claims, 20 Drawing Sheets

(51) Int. Cl.
*A01C 7/04* (2006.01)
*A01C 21/00* (2006.01)

(58) Field of Classification Search
CPC ......... A01C 7/203; A01C 7/206; A01C 7/046; A01C 21/005; A01C 7/20
USPC .......................................... 111/170, 174, 176
See application file for complete search history.

(56) References Cited

U.S. PATENT DOCUMENTS

| | | | | |
|---|---|---|---|---|
| 3,964,639 A * | 6/1976 | Norris | ............ | A01C 7/082 |
| | | | | 111/176 |
| 4,217,835 A * | 8/1980 | Fox | ............ | A01C 5/06 |
| | | | | 111/134 |
| 4,422,392 A * | 12/1983 | Dreyer | ............ | A01C 7/203 |
| | | | | 111/134 |
| 6,367,396 B1 * | 4/2002 | Meyer | ............ | A01C 7/081 |
| | | | | 111/176 |
| 6,505,569 B1 * | 1/2003 | Richard | ............ | A01C 7/042 |
| | | | | 111/174 |
| 6,827,029 B1 * | 12/2004 | Wendte | ............ | A01C 7/042 |
| | | | | 111/185 |
| 8,505,473 B1 * | 8/2013 | Martin | ............ | A01C 7/006 |
| | | | | 111/164 |
| 8,985,037 B2 * | 3/2015 | Radtke | ............ | A01C 7/046 |
| | | | | 111/171 |
| 9,585,299 B2 * | 3/2017 | Schumacher | ............ | A01C 7/203 |
| 9,730,379 B2 * | 8/2017 | Wendte | ............ | A01C 7/082 |
| 9,769,978 B2 * | 9/2017 | Radtke | ............ | A01C 7/105 |
| 2007/0039529 A1 * | 2/2007 | Sauder | ............ | A01C 7/046 |
| | | | | 111/185 |
| 2011/0271887 A1 * | 11/2011 | Shoup | ............ | A01C 7/046 |
| | | | | 111/178 |
| 2012/0067260 A1 * | 3/2012 | Garner | ............ | A01C 7/042 |
| | | | | 111/171 |
| 2017/0105334 A1 * | 4/2017 | Nyc | ............ | A01C 7/046 |

FOREIGN PATENT DOCUMENTS

| | | | | |
|---|---|---|---|---|
| GB | 150140 | | 9/1920 | |
| GB | 2004722 A | * | 4/1979 | ............ A01C 5/06 |
| WO | 2014183182 A1 | | 11/2014 | |
| WO | 2014205454 A1 | | 12/2014 | |
| WO | 2015077743 A1 | | 5/2015 | |

* cited by examiner

ROW UNIT FOR AN AGRICULTURAL PLANTING IMPLEMENT

CROSS-REFERENCE TO RELATED APPLICATIONS

This application claims priority under 35 U.S.C. § 119 to provisional application Ser. No. 62/202,539, filed Aug. 7, 2015, which is herein incorporated by reference in its entirety.

FIELD OF THE INVENTION

The invention is directed generally to agricultural implements. More particularly, but not exclusively, the invention is direct towards row units for use with an agricultural planting implement.

BACKGROUND OF THE INVENTION

An agricultural row crop planter is a machine built for precisely distributing seed into the ground. The row crop planter generally includes a horizontal tool bar fixed to a hitch assembly for towing behind a tractor. Row units are mounted to the tool bar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Agronomics has determined that seeds grow best at certain depths. Therefore, it has been desirable to attempt to form the furrows with a bottom at this depth in order to position the seed thereat to give the best chance at higher yields. This has been done with disk openers, gage wheels, depth adjustment systems, and combinations thereof. However, due to the ever-changing conditions, makeup, obstructions, and/or soil characteristics, the control of the depth is often inaccurate. This causes seeds to be planted at various depths, which can affect how the crops grow.

Therefore, there is a need in the art for a row unit for use with a planter that provides for creating and maintaining a furrow of desired depth throughout a field. This includes generally all aspects of a row unit for both creating the furrow and delivering the seed to the furrow.

SUMMARY OF THE INVENTION

It is therefore a primary object, feature, and/or advantage to overcome and/or improve on deficiencies in the art.

It is another object, feature, and/or advantage of the invention to provide a row unit with improved depth control.

It is yet another object, feature, and/or advantage of the invention to control the depth at which a seed is planted throughout a field.

It is still another object, feature, and/or advantage of the invention to lower the location of a seed meter on a row unit to control the delivery of seed therefrom.

It is a further object, feature, and/or advantage of the invention to provide better stability for positioning a seed shank for creating a furrow.

It is yet a further object, feature, and/or advantage to improve on row unit performance.

These and/or other objects, features, and advantages of the invention will be apparent to those skilled in the art. The invention is not to be limited to or by these objects, features and advantages. No single embodiment need provide each and every object, feature, or advantage.

The disclosure is directed towards a row unit having one or more seed meters, trench or furrow opener, and a seed delivery system. The seed meters can be under vacuum pressure or positive pressure, and can take many forms. The opener can be a shank and/or opener wheels, which can be disks or saw tooth in configuration. The seed delivery systems can also take many forms, which can include, but are not limited to, catch wheel systems, gravity-based systems, belts or other endless members, positive pressure delivery systems, and/or some combination of the same. As will be understood, the various row units as are included in the disclosure can include one or more of the different components to provide a vast and various combination of elements that will comprise the row unit.

Additional elements of the row unit will also be included. These can include, but are not to be limited to, depth control assemblies and systems, trench or furrow closing assemblies and systems, intelligent control systems (electronics, computer processing units), and/or other elements that will help to plant seed via the components of the row units.

Figure 1:
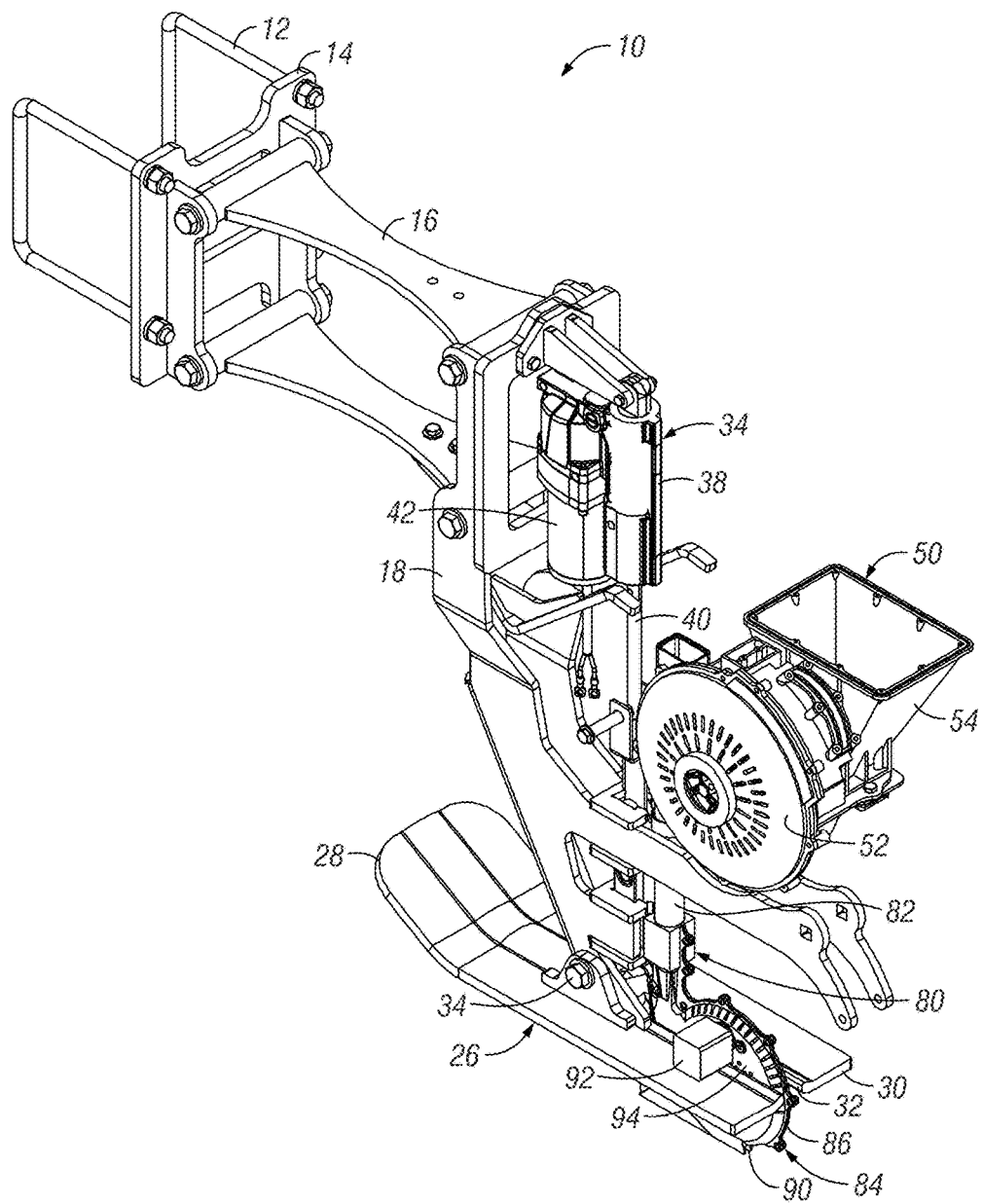
FIG. 1 is a perspective view of a row unit according to aspects of the invention.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present invention relates generally to a row unit for an agricultural planting implement. As is known, planters include a plurality of row units spaced thereon to plant a plurality of rows of seed at a single time. In order to plant the seed for a crop, a furrow is created in the field as the planter moves through the field, such as being pulled by a tractor or other tow vehicle. The furrow is created to a desired depth, which may be determined by agronomic studies. Planting certain crop seeds at certain depths has been shown to provide a greater yield of crop grown by the seed. Therefore, the row unit 10 according to aspects of the invention, provides for improved ways of controlling both the depth of furrow created by the row units 10 of a planter (not shown), and also the delivery of the seed from the row units to the furrow, which can provide desired spacing between seeds. It is the depth and spacing of seeds relative to one another and the field to which can improve the yield of a crop grown therefrom.

Therefore, FIGS. 1-13 show various aspects of a row unit 10 according to various aspects of the invention. The row unit 10 can be used generally with any type of planting implement, such as by connecting to a toolbar thereof. For example, the row unit 10 shown in the figures includes a plurality of U-bolts 12 attached to a faceplate 14. The U-bolts 12 can surround or otherwise attach to a toolbar of a planting implement so as to connect thereto and to maintain said connection and position thereon. However, it is to be appreciated that generally any type and manner of connecting a row unit to a planter can be used with a row unit 10 of the invention. Extending from the faceplate 14 is a linkage 16. The linkage 16 in the figures is shown to be a four bar linkage having a single upper bar and a single lower bar The linkage system is utilized to provide for up and down movement of the row unit 10 relative to the tool bar of the planter, and therefore, the two bar linkage is not to be limiting. For example, a four bar linkage that includes two bars each on the top and bottom can be utilized to connect the row unit 10 to a planting implement. Still other types of connections between the row unit 10 and the implement are to be intended to be included as part of the invention. This includes direct connection without the use of a linkage at all. Such an example is shown and described in U.S. patent application Ser. No. 14/665,724, which is hereby incorporated by reference in its entirety.

Extending from and operably connected to the faceplate 14 of the row 10 is a frame 18. The frame 18 can take generally any type of shape and configuration, and is comprised of steel or other rigid materials. In the figures of the row unit 10 shown, the frame 18 extends generally downward and away from the linkage 16. The frame 18 can be utilized to mount and/or otherwise couple the components of the row unit 10 thereto, such that the components can be utilized for planting.

For example, at a generally lower end of the frame 18 is a ski 26. The ski 26 is a member which is pivotally coupled to the frame, such as at pivot points 34. The ski 26 is configured to ride on or otherwise interact with the ever changing landscape of a field to control the depth of furrow created by additional components herein. The ski 26 comprises steel or other rigid materials. As shown in the figures, the ski 26 includes a front 28 and an aft portion 30. The front 28 of the ski 26 is at least partially upward sloped. The upward sloping of the front end 28 of the ski 26 allows for the ski to ride on or otherwise interact with the changing topography of the field, while mitigating the risk of the front of the ski 26 digging into or otherwise becoming stuck into a portion of the field. The aft portion 30 of the ski 26 includes a spaced slot 32 extending from the aft portion 30 and towards the front portion 28 of the ski 26. As will be understood, additional components of the furrow creation and seed distribution of the row unit 10 can be positioned within the slot 32 of the ski 26.

As mentioned, the ski 26 is pivotally mounted to the frame 18, such as at pivot points 34. The pivoting allows for the ski 26 to maintain contact and/or ride along the ever changing topography of the field, including in any changing conditions of the field. According to some aspects, the front end 28 of the ski 26 may also include a triangular shaped wedge member 29, which can further aid in cutting through the composition of the field, as well as through any ruts, hills, clumps, or any other obstructions that may be located within the field. The ski 26 could also have a polymer attached to the underside to aid in sliding, such as in wet conditions. The ski is shaped to aid formation of a trench and to distribute down pressure broadly and to the outside edges of the ski so as to not pack the ground around the trench.

Figure 2:
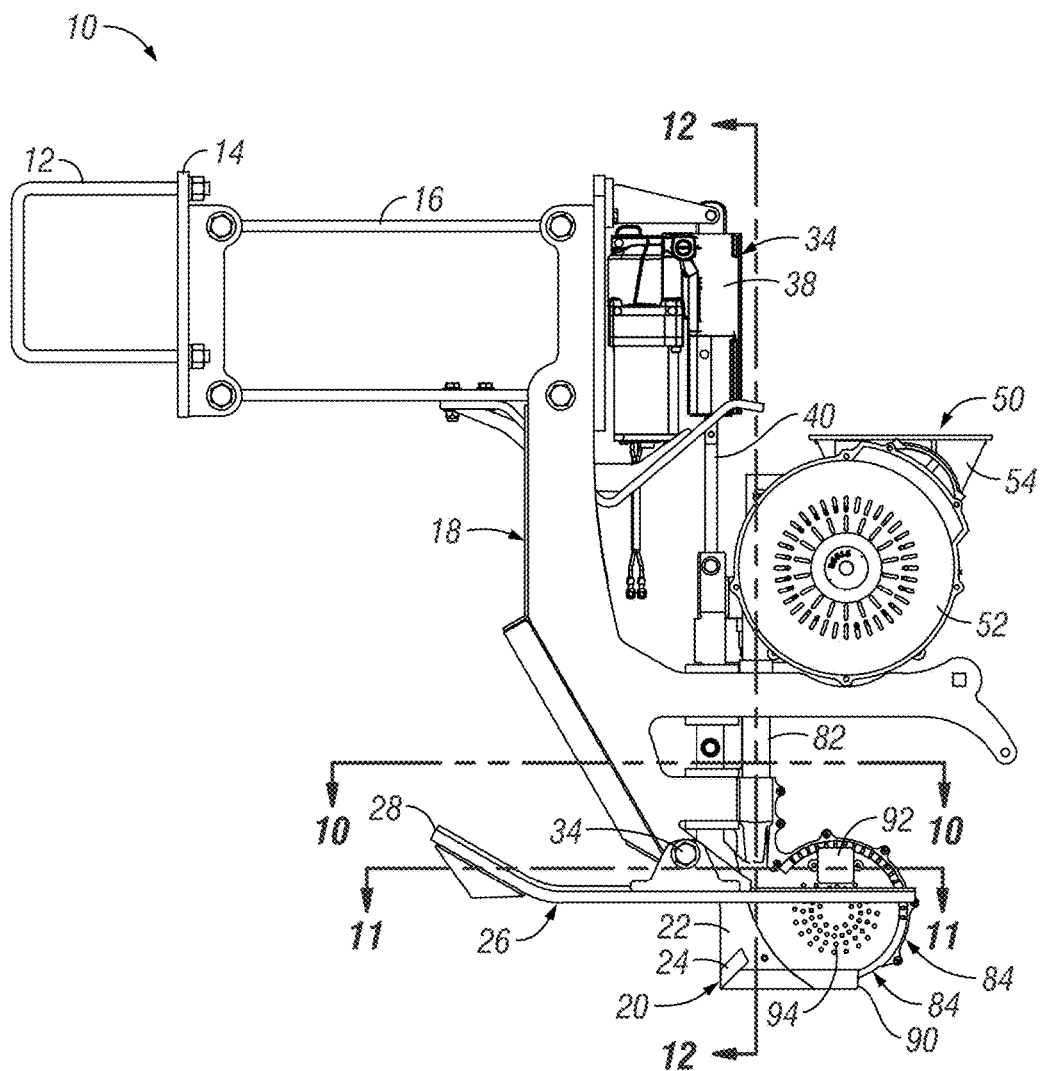
FIG. 2 is a side elevation view of a row unit according to aspects of the invention.

Shown extending downward below a bottom portion of the ski 26 and positioned generally in the slot 32 thereof is a winged shank 20. The winged shank 20 includes a shank body 22 and one or more wings 24. An example of a winged shank 20 for use with the row unit 10 of the invention is shown and described in U.S. Prov. Patent Application No. 62/164,326, which is hereby incorporated by reference in its entirety. However, it is noted that the shank shown and described in Application No. 62/164,326 is not limiting to the invention. For example, the shank 20 as shown in the figures is separate from the frame 18, while the shank in the '326 application is a part of the frame 18. As will be understood with respect to additional components of the row unit 10, the shank 20 can be coupled to a seed delivery system 80, which is coupled to a seed meter 50 of the row unit. The shank 20 includes wings 24, which may be slightly upwardly positioned wings when moving from a front to a back portion of the wing. The wings are slanted or otherwise sloped in order to provide a constant downward pressure on the wings 24, which will aid in keeping the shank in the ground when creating a furrow. For example, when the row unit as shown in FIG. 2 moves in a manner towards the left of the page, the forces of the soil will be acting in an opposite direction. Having the wings 24 sloped in the manner shown in FIG. 2 will provide that the soil acts in a rearwardly and downwardly manner, which will aid in keeping the shank in the ground. However, the ski 26 will work with the shank to ensure that the shank does not continue digging past or beyond a desired depth of furrow. Thus, the wing and shank work together in order to provide and maintain a desired depth of furrow created by the row unit 10.

Additional aspects of the position control of the row unit 10 include an actuator 36, which may be a position cylinder. The actuator 36 shown in the figures is an electro-hydraulic actuator. Therefore, an electric and hydraulic reservoir and motor 42 is shown operably connected to the actuator 36 in order to provide the power for said actuator. Furthermore, the actuator includes a housing 38 with a rod 40. The rod 40 is movable relative to the generally fixed position of the housing 38. Therefore, extension or retraction of the rod 40 relative to the housing 38 will adjust the position of the ski 26 relative to the position of the shank 20. This can adjust the position of the wing 26 such that the depth of the furrow created by the shank can be varied. Furthermore, the actuator can be utilized to raise the shank upwardly past a zero depth, which raises the entire row unit 10 out of the ground. Thus, the single actuator 36 can provide two functions, adjusting/controlling depth and lifting the row unit 10 out of the ground. Therefore, the plurality of row units 10 on the planting implement can be individually lifted and lowered as needed, and not all of the row units 10 need to be moved simultaneously. This will provide added benefits, such as greater adjustability for the row units. The lifting of the row units also allows the weight of the planter to be reduced. Because the lifting mechanism is in the individual row units, this function does not have to be built into the frame structure, thus reducing the weight of the frame structure.

Figure 3:
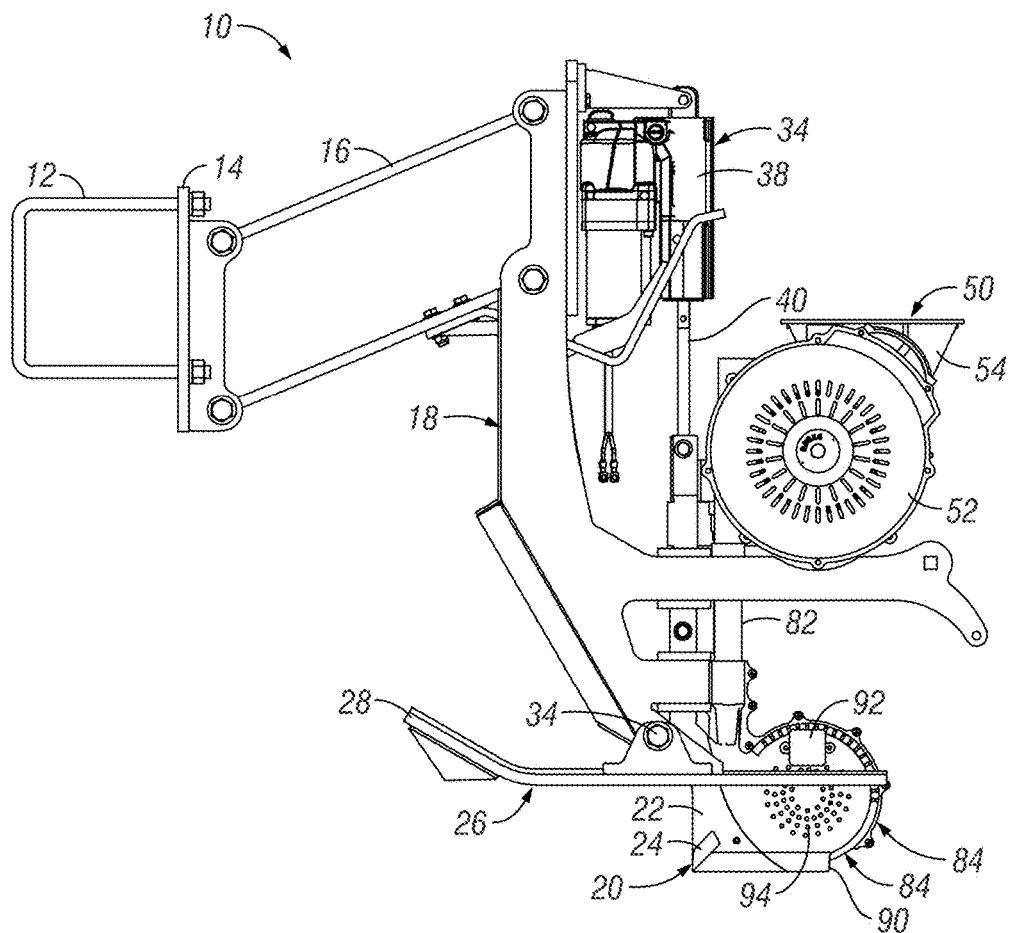
FIG. 3 is a side elevation view of a row unit in a raised position.
Figure 4:
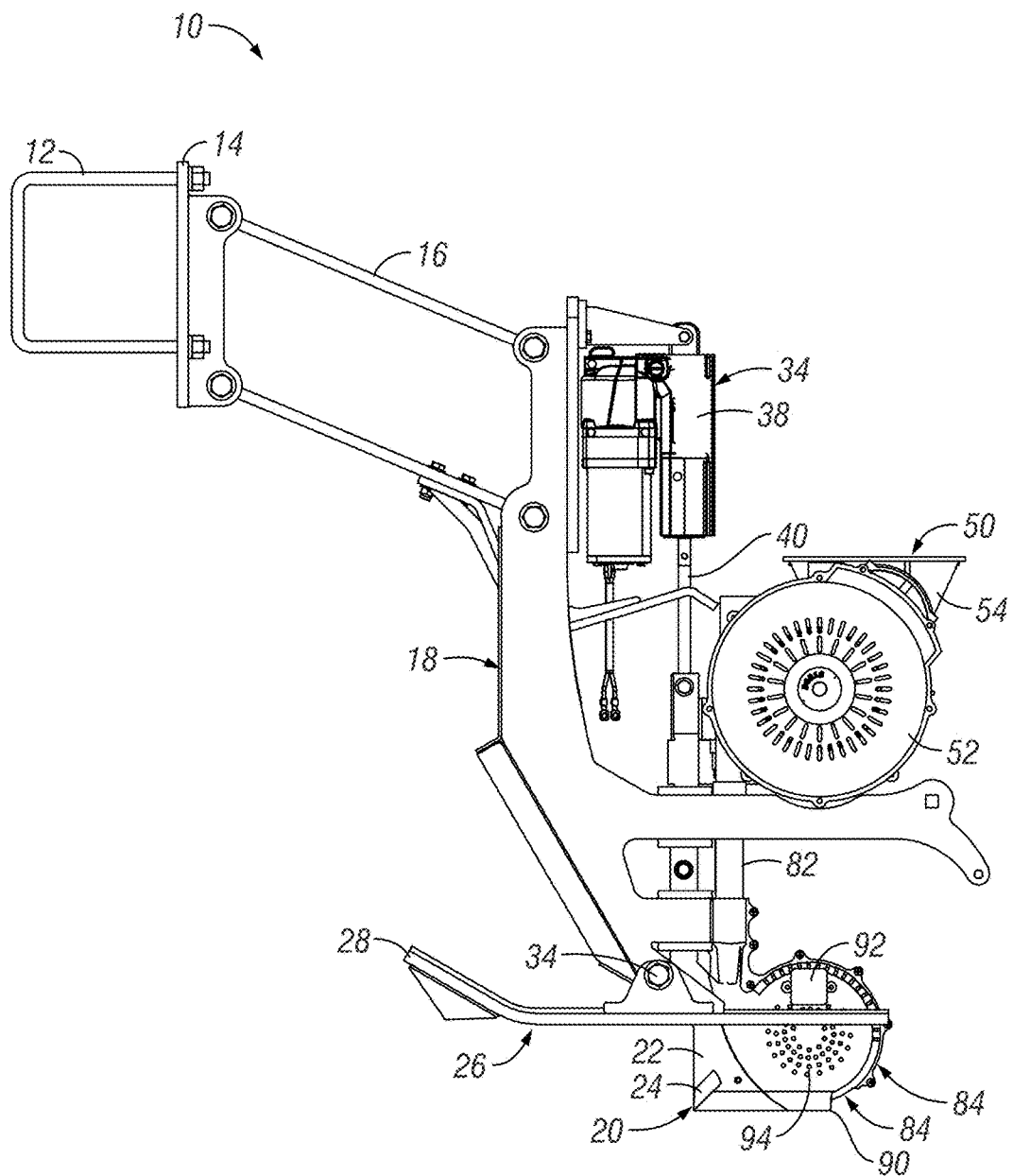
FIG. 4 is a side elevation view of a row unit in a lowered position.
Figure 5:
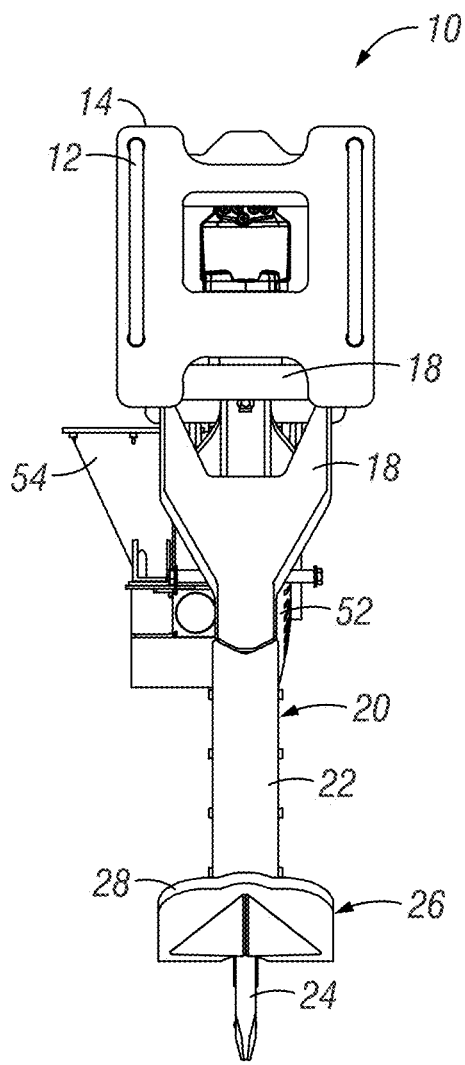
FIG. 5 is a front view of a row unit according to aspects of the invention.
Figure 6:
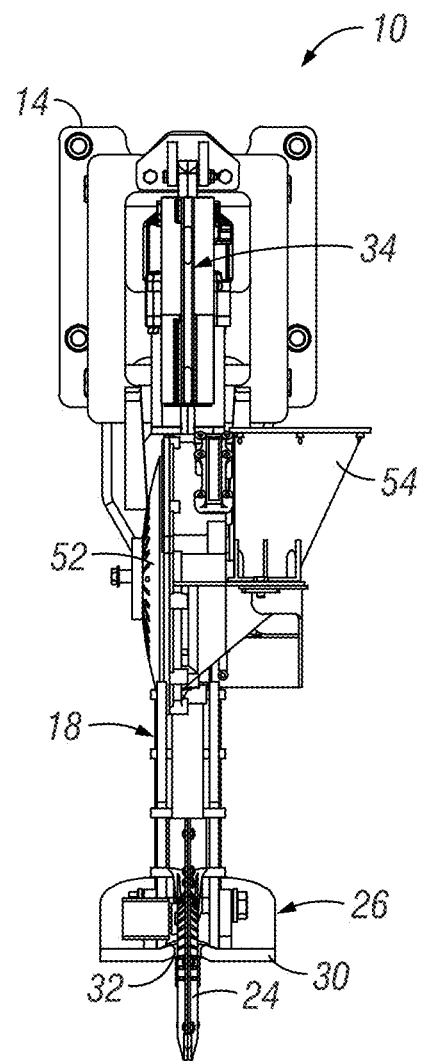
FIG. 6 is a rear view of a row unit according to aspects of the invention.
Figure 7:
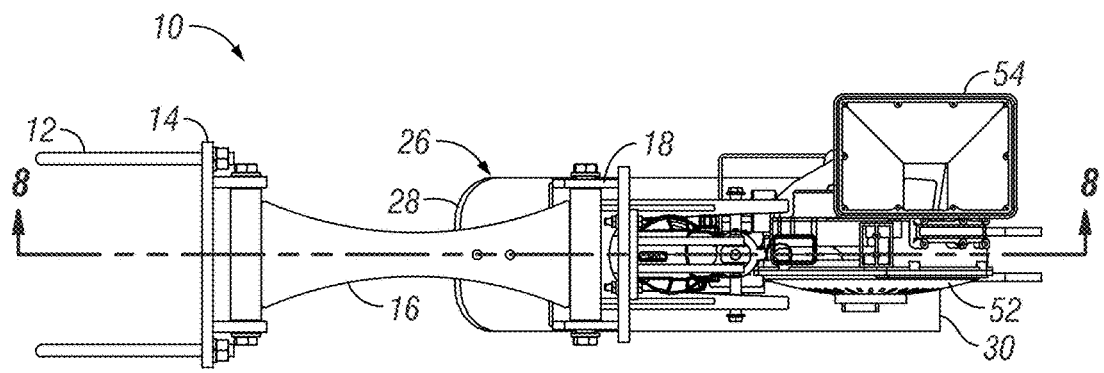
FIG. 7 is a top plan view of a row unit.
Figure 8:
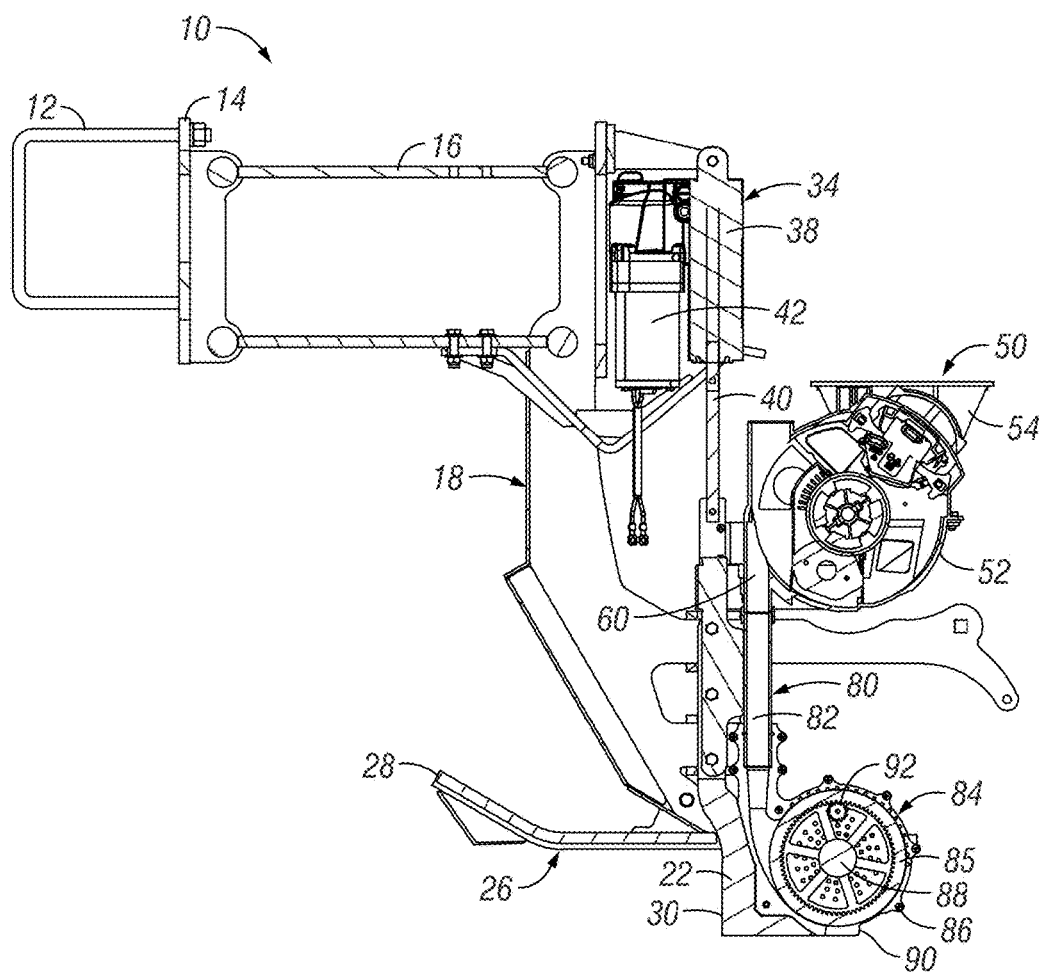
FIG. 8 is a side sectional view of the row unit of FIG. 7.
Figure 9:
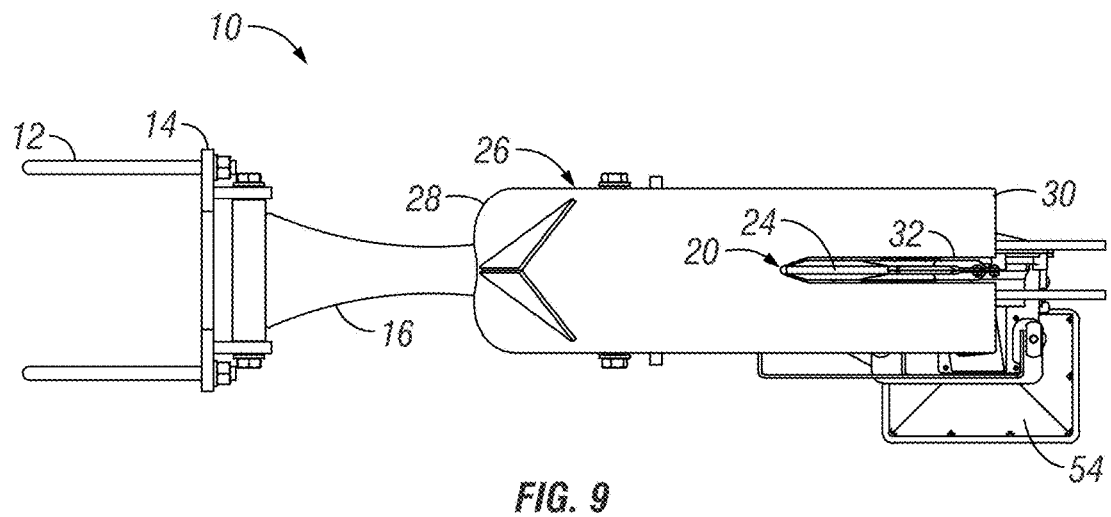
FIG. 9 is a bottom plan view of a row unit according to aspects of the invention.
Figure 10:
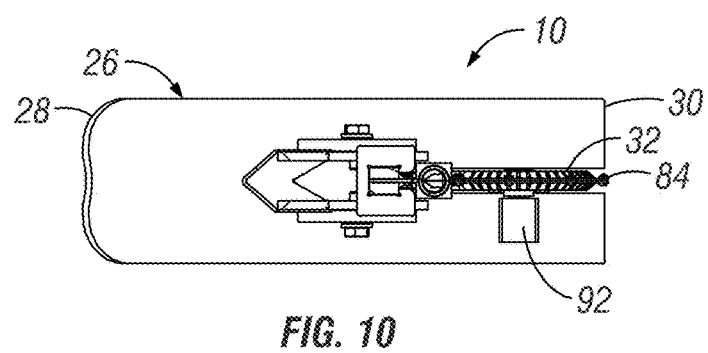
FIG. 10 is a top sectional view of the row unit of FIG. 2.
Figure 11:
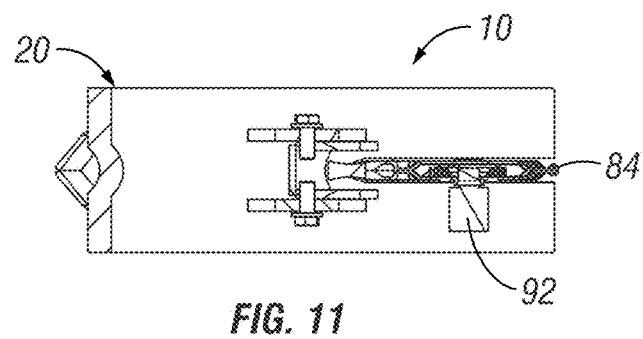
FIG. 11 is another top section view of the row unit of FIG. 2.
Figure 12:
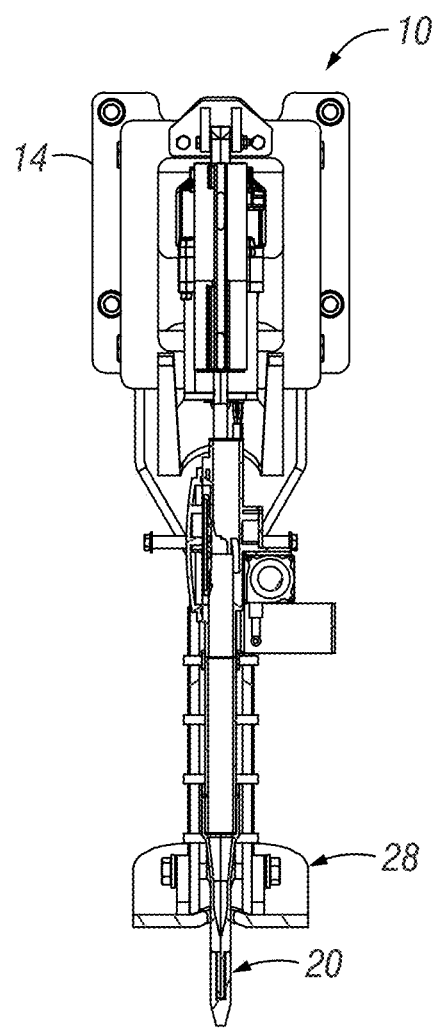
FIG. 12 is a rear sectional view of the row unit of FIG. 2.
Figure 13:
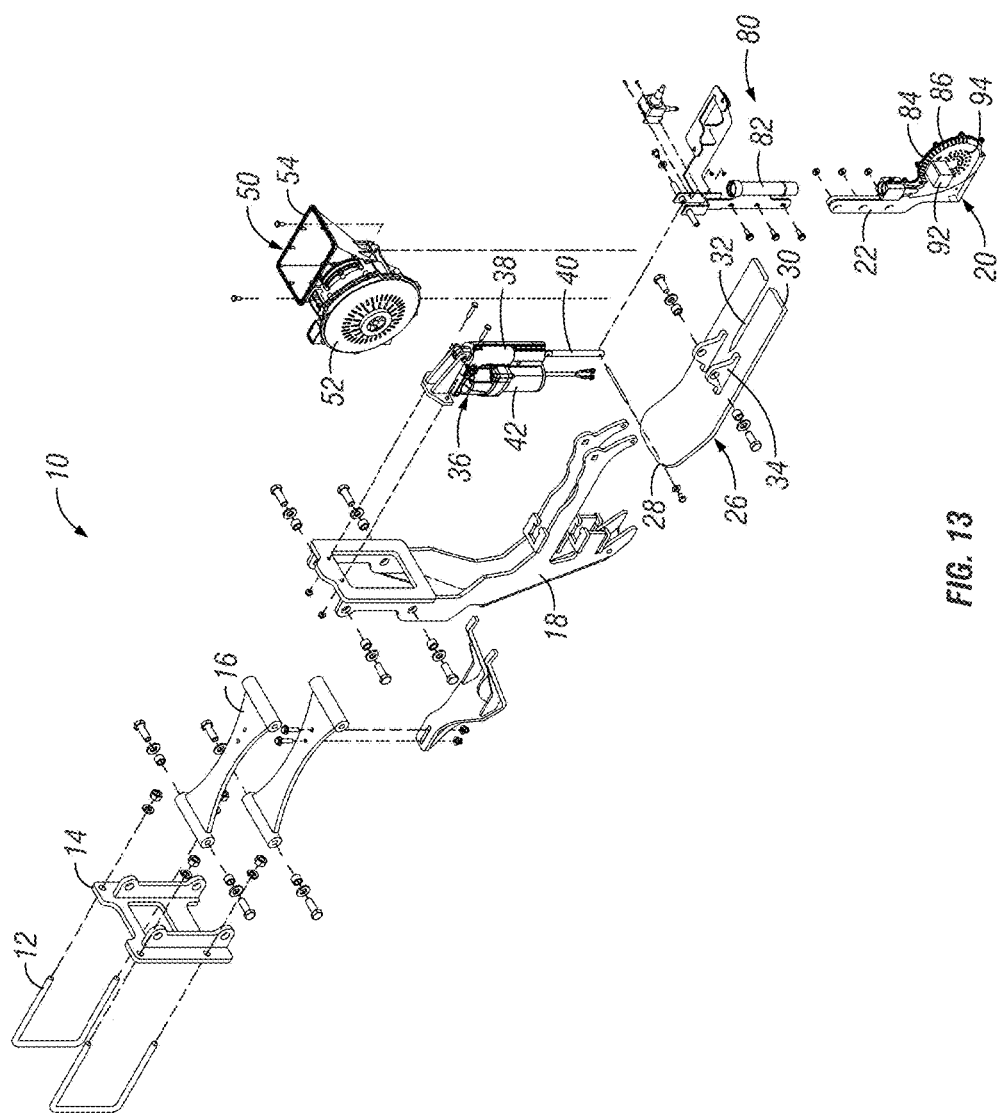
FIG. 13 is an exploded view of a row unit according to aspects of the invention.

The row unit 10 of the invention has substantial variability in terms of location and positioning. For example, FIG. 2 shows the row unit 10 at approximately 90° angle to the missing toolbar of the planting implement. However, FIG. 3 shows the row unit 10 in a raised manner, such as being raised by an actuator and/or being moved over a terrain that is higher at the location of the row unit 10 then at the location of the tool bar. Furthermore, FIG. 4 shows the row unit 10 at a lower position lower than the position of the toolbar such that the movement can be shown in a lower manner. Therefore, the row unit 10 has great mobility and float and moving relative to the planting implement to still work and create and maintain the furrow of desired depth.

Still additional components of the row unit 10 includes a seed meter 50 operably connected to the frame 18. As is shown in the figures, the seed meter 50 is shown at a rearward portion of the row unit 10 and positioned generally above the winged shank 20. The winged shank 20 will create the furrow to which a seed is to be planted. Therefore, having the seed meter just in generally above the winged shank 20 will allow for the seed to be dropped in a manner into an already created furrow. As is further shown, the seed meter is positioned at a lower level than conventional meters. The lowering of the seed meter 50 relative to the level of the field will provide numerous advantages. For example, the lowered position of the seed meter relative to the field, and thus furrow, will provide that a seed released from said meter to be dispensed in the furrow will have less distance to travel between the release therefrom and positioning into the furrow. This shorter distance will reduce the amount of error in terms of bounce or other unwanted obstructions while positioning the seed in the furrow. The shorter distance will also allow for greater control of spacing between seeds. A less distance of release and travel will ensure that the seed is positioned at an ideal location relative to a previous seed, such that the seeds are evenly spaced according to agronomic developments, in order to provide for the best growing conditions for the individual seeds. Additional aspects of the seed meter 50 include a hopper 54 operably attached thereto. The hopper 54 can be a row unit hopper and/or could be connected to an air seed delivery such that a bulk hopper of the planting implement can deliver seed to the individual row units on an as needed basis. The seed meter 50 includes a housing 52 for housing a seed disk, singulating, and other seed dispensing components. The seed meter 52 can be generally any type of seed meter, including but not limited to, air seed meters (both positive and negative pressure air seed meters), finger meters, and the like. The present invention is not to be limited to a specific type of seed meter for use in singulating and dispensing seed therefrom for the row units 10 of the invention.

Regardless of the type of seed meter used, the seed in the meter 50 is singulated and dispensed such that a single seed is delivered via a chute 60 of the meter housing 52 in a controlled rate. A seed sensor can be positioned in the seed chute for counting seed. An example of such a seed sensor is shown and described in U.S. application Ser. No. 13/234,483, now U.S. Pat. No. 8,843,281, which is hereby incorporated by reference in its entirety. The controlled rate in singulation of the seed in the meter will provide for better control of placement of seed relative to previous and after seeds planted through a field. As mentioned, agronomic principles have determined that certain types of crop require a certain distance or spacing between individual seeds in a row in order to have the best growing conditions for providing the best yield. Therefore, it is important to be able to control the spacing at a high level in order to achieve said desired spacing between individual seeds.

Therefore, additional aspects of the invention provide for controlling the spacing of the seed that has been singulated and dispensed by a seed meter 50 of the row unit 10. As is shown in the figures, the row unit 10 further includes a seed delivery system 80. The seed delivery system 80 is coupled or otherwise upwardly connected to the seed meter 50 of the row unit 10. In the figures shown, this includes the use of a seed tube 82 operably connected to the seed chute 60 of the meter housing 52. The seed tube can utilize gravity or positive pressure from a positive pressure meter to move the seed from the seed chute and towards the delivery of the seed into the furrow. As mentioned, the seed meter 50's position at a lower level relative to the ground compared to traditional row units such that the seed tube will be shorter and provide for less travel of the seed there through. For example, it is contemplated that the seed meter 50 be positioned approximately 8 to 36 inches above the ground, e.g., above the bottom of the winged shank 20. This is much less than what is provided for with current row units such that the amount of travel from release or dispensement from the seed meter to the bottom of a furrow would be less. This less distance again will allow for fewer instances of bounce within the seed chute and/or tube, as well as having a more controlled positioning in a created furrow.

In addition, operably connected to the seed tube 82 can be a catch wheel mechanism 84. The catch wheel mechanism can include a neck portion connected to the seed tube 82 such that the seed passing through the seed tube will continue directly into a catch wheel housing 86. Positioned generally within the housing 86 is a wheel 85 which can catch the seed such that it will control the movement of the seed from the catch point, thorough the housing 86, and to a dispensing location 90. The controlled movement of the seed in the housing 86 by the wheel 85 can be matched with the velocity of the agricultural planter such that the seed being released via the catch wheel will experience generally zero relative velocity to the ground. Thus, as the seed is released, it will be dropped into the furrow in a manner in which there will be little to no bounce, roll, or other movement. This controlled delivery will further aid in the controlled spacing of the seed as it is planted via the row unit. An exemplary version of the seed delivery apparatus, which is similar to that shown and described in the figures, is shown and described in U.S. application Ser. No. 14/619,758, which is hereby incorporated by reference in its entirety. In the '758 application, the catch wheel mechanism includes a pliable wheel for trapping or otherwise catching the seed between a portion of the pliable wheel and the interior of the housing. Therefore, the delivery system 80 of that shown in the figures may also include a pliable wheel as the wheel 85 within the housing 86. As mentioned and best shown in FIG. 8, the seed delivered through the seed tube 82 can be controlled or otherwise positioned between an outer portion of the pliable wheel 85 and an interior wall of the housing 86 such that only movement of the wheel will move the seed therewith.

The rotation of the pliable catch wheel 85 can be set at a rotational velocity substantially equal to that of the velocity of the planter, so as to provide for zero relative velocity at the dispensing point 90 of the seed delivery system 80. To control the rotational velocity of the wheel 85 within the housing 86, a motor such as a brushless DC motor 92 can be positioned on an exterior of the housing 86. This brushless DC motor can be connected to an intelligent control, such as a central processing unit, wherein the speed of the planter and/or tractor can be calculated such that the rotational velocity of the catch wheel 85 will be similar such that the seed released therefrom will have zero relative velocity. Furthermore, the catch wheel can be ground driven, which eliminates the drive motor.

Still further, it is contemplated that the brushless DC motor not be included on an exterior of the housing 86. To the contrary, it is contemplated that an integrated motor, such as an integrated pancake motor 88 being included and/or integrated with the pliable wheel 85. An integrated motor for use with a seed disc is shown and described in U.S. application Ser. No. 14/592,965, which is hereby incorporated by reference in its entirety. A similar principle can be used for the catch wheel mechanism 84 of the seed delivery system 80 of the row unit 10. For example, the components of the brushless DC motor can be reversed such that the energy input to the shaft portion of the catch wheel 85 can cause the magnets position at an outer portion of the catch wheel to begin rotation around said shaft. This energy is what can be manipulated so as to control the rotational velocity of said catch wheel 85 so as to substantially match the velocity of the planter moving through the field. This is shown best in FIG. 8, where the integrated motor 88 is shown with the pliable catch wheel 85.

Furthermore, while a pliable catch wheel is shown and described, it should be appreciated that of the additional types of catch wheels can be used with the seed delivery system and are considered to be part of the row unit 10 herein described for example notches, brushes, belts, fingers, and the like can all be utilized to "catch" or otherwise receive the seed being released from the seed meter 50 and passed through the seed tube 82. Whatever type of catch wheel utilized, the purpose will remain the same and controlling the movement of the seed from the catch point to the dispensing point 90 such that the dispensing will be controlled to provide for proper and/or desired spacing of one seed relative to the next in the created furrow.

Therefore, the row unit 10 has been shown and describe, which includes numerous improvements over other row units. The inclusion of the winged shank 20 and the ski 26 is a unique and novel way to create and maintain a furrow of desired depth as the row unit 10 moves through a field, and regardless of soil type. The wings 24 on the shank 20 are configured in a way which will maintain a generally downward force acting on the shank so as to urge the shank into the ground. The distance between the bottom of the shank and the bottom of the ski 26 can be set, such as by the actuator 36, to provide for the desired of furrow created. The wings should not be penetrating into the ground such that the ski will be maintained on or at the top of the field. Therefore, the distance between the top of the field (in other words the bottom of the ski) and the bottom of the furrow (in other words the bottom of the winged shank) will be maintained throughout the field, regardless of any change in soil type and/or condition. Furthermore, the inclusion of an electromechanical cylinder on the row unit 10 will provide for greater control in adjusting and positioning of the components thereof. Furthermore, the two way action of the cylinder can provide that the cylinder positions the depth of the furrow while also lifting the row unit above the ground on an individual row unit basis. This will provide for greater control of the plurality of row units.

Still addition, the lowering of the seed meter 50 relative to the bottom of the furrow will provide for additional advancements, such as reducing the distance that a seed must travel after being singulated and dispensed by a seed meter. This will aid in controlling the positioning of a seed relative to the furrow, such as by mitigated the amount of balance or roll in said furrow. The inclusion of a seed delivery system, such as a catch wheel with an integrated motor, will further aid in controlling the delivery of the seed into the furrow such that there is little to no balance or roll within such furrow. Still further, the lowering of the seed meter will allow for less downforce to be required, as the seed meter is not positioned at such a high level. The lowering of the seed meter will reduce the amount of bounce acting on the meter, such as when the row unit encounters and obstruction. Lowering the location of the seed meter will reduce the effect of any sort of obstruction on the seeds as they are dispensed from the seed meter and towards positioning in a furrow. Still further advantages that are obvious to those skilled in the art are to be considered part of the invention.

Figure 14:
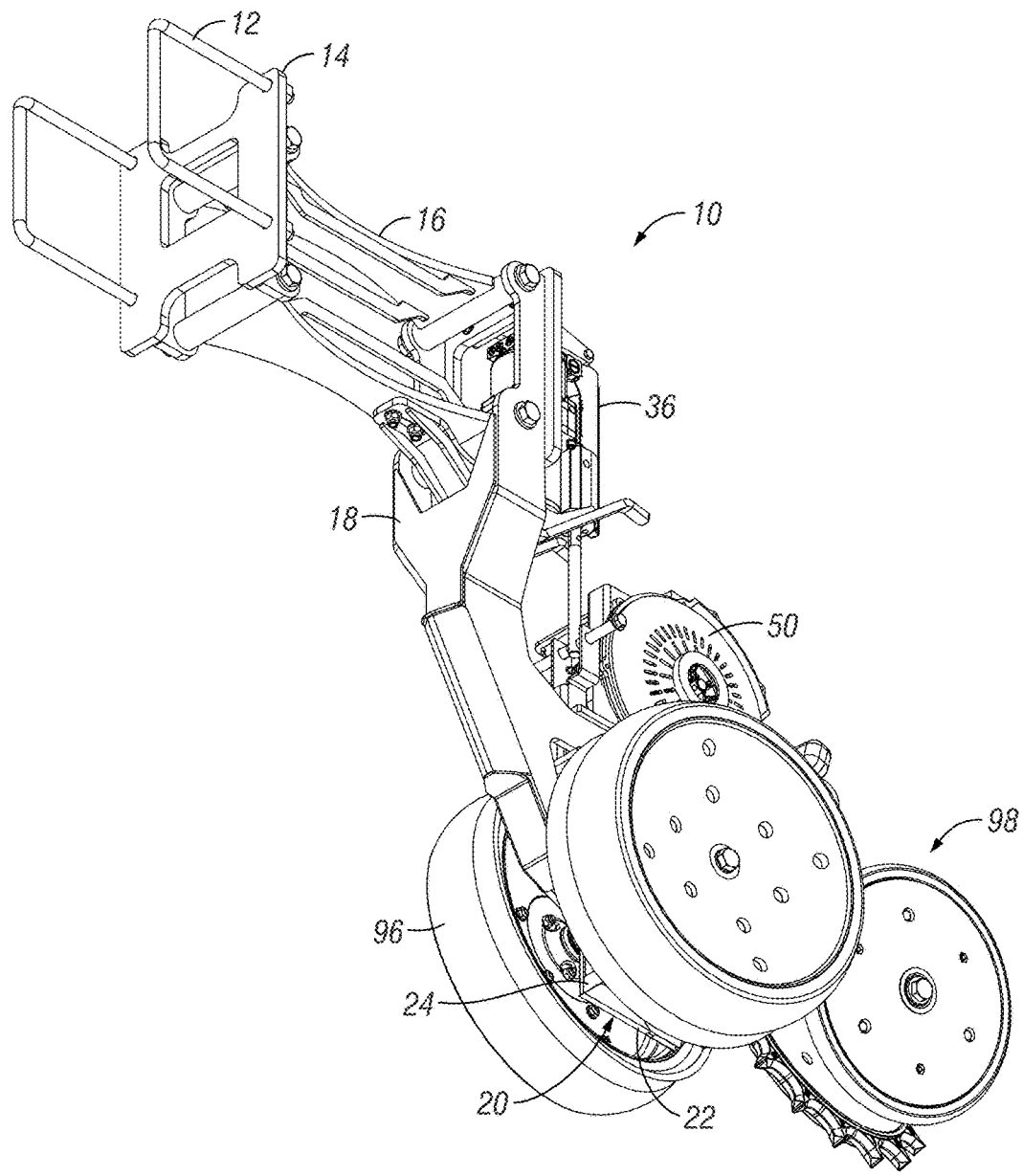
FIG. 14 is a perspective view of another row unit according to aspects of the invention.
Figure 15:
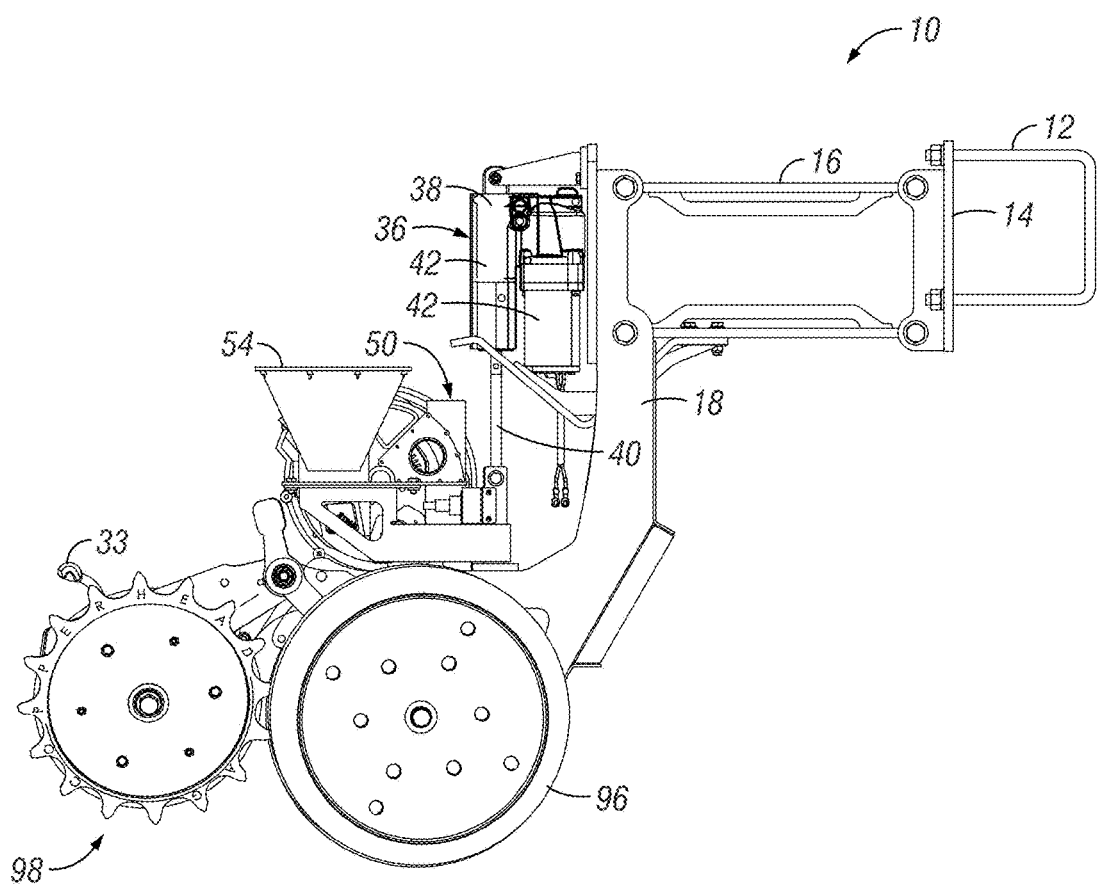
FIG. 15 is a side elevation view showing aspects of the row unit of FIG. 14.
Figure 16:
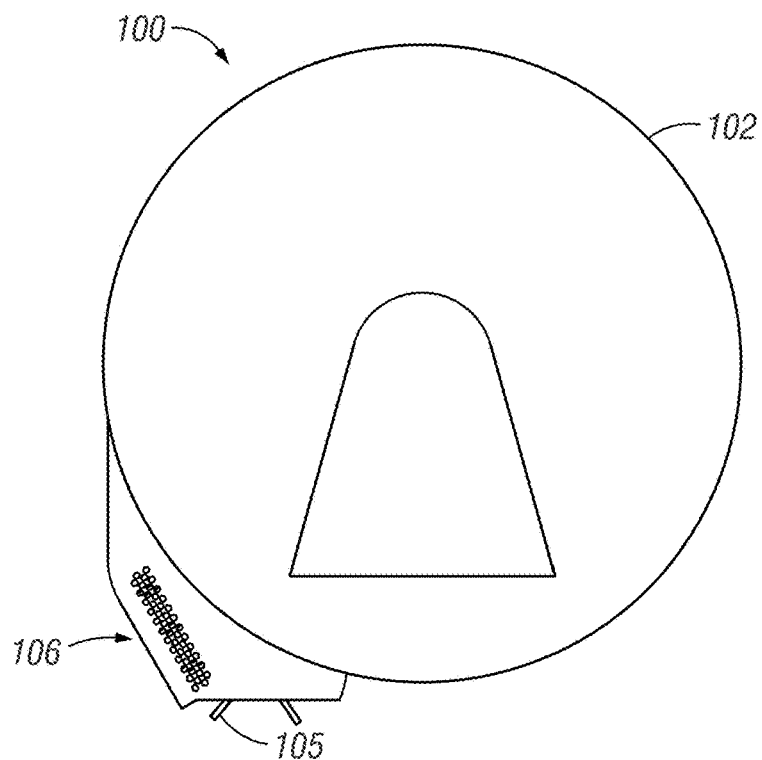
FIG. 16 is a front view of a seed meter for use with a row unit according to aspects of the invention.
Figure 17:
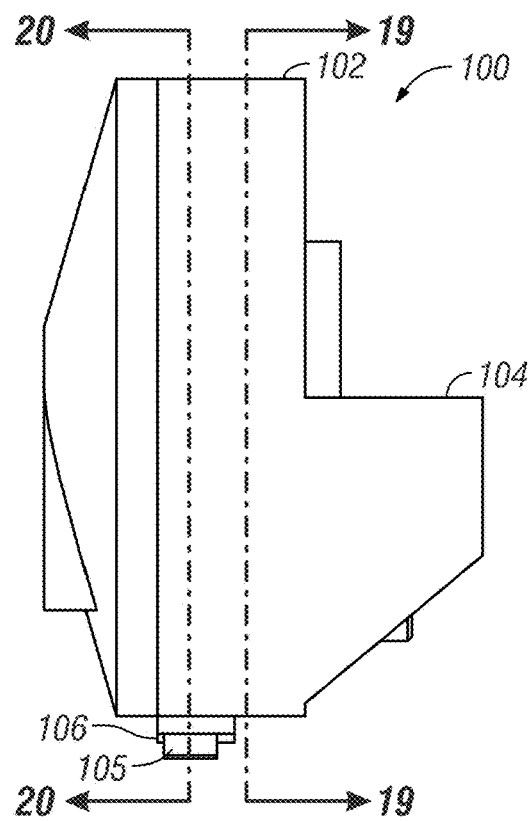
FIG. 17 is a side elevation view of the seed meter of FIG. 16.
Figure 18:
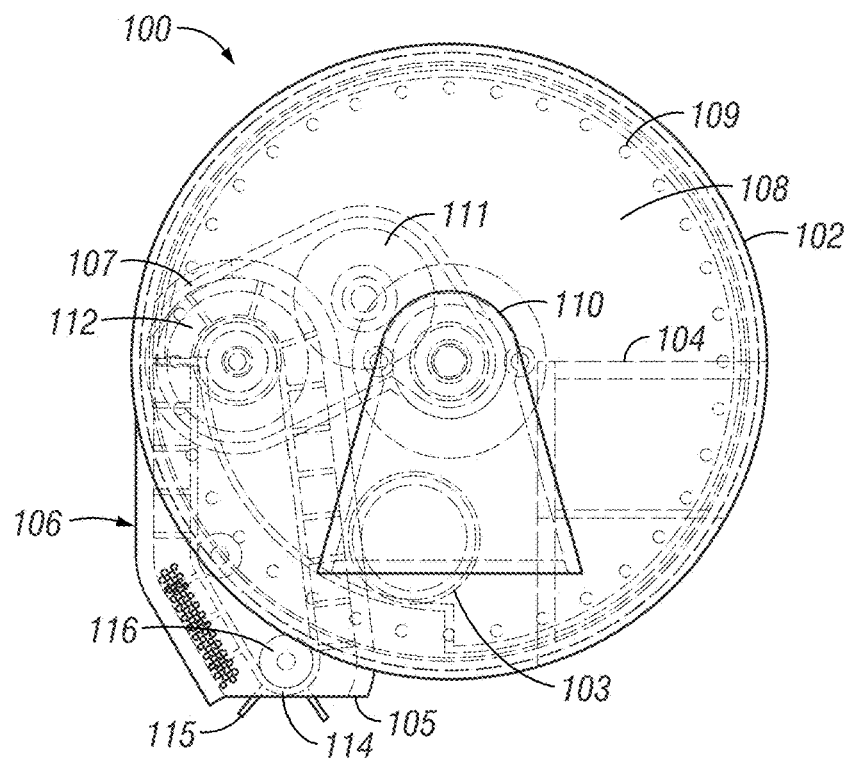
FIG. 18 is a partial see-through of the seed meter of FIG. 16.
Figure 19:
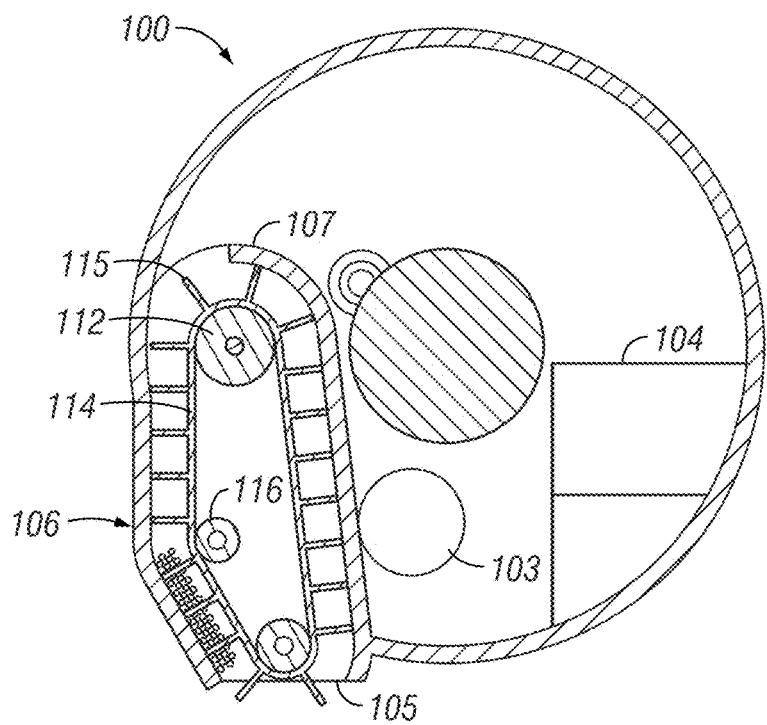
FIG. 19 is a sectional view of the seed meter of FIG. 16.
Figure 20:
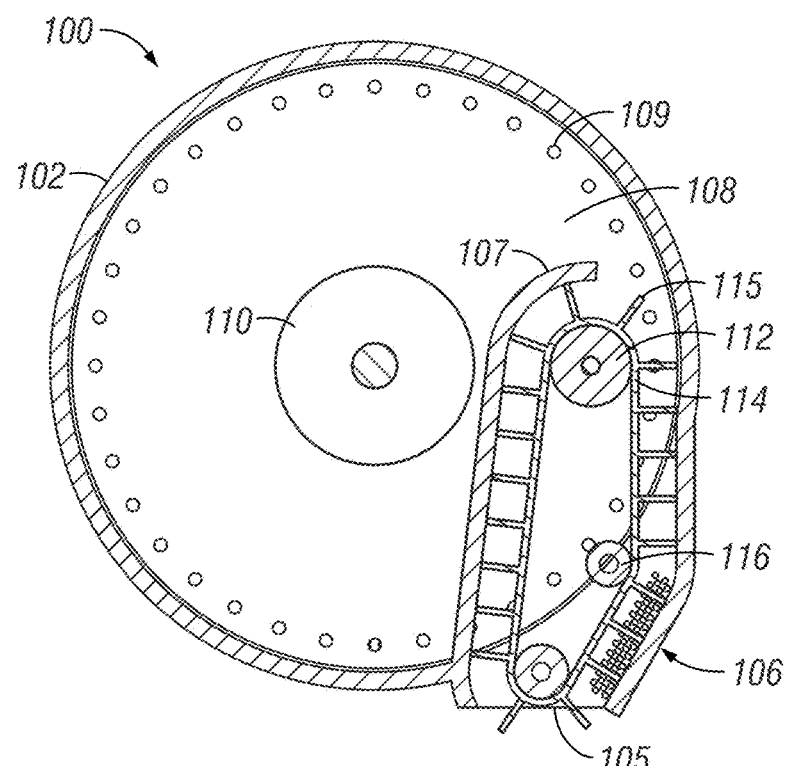
FIG. 20 is an opposite sectional view of FIG. 19.
Figure 21:
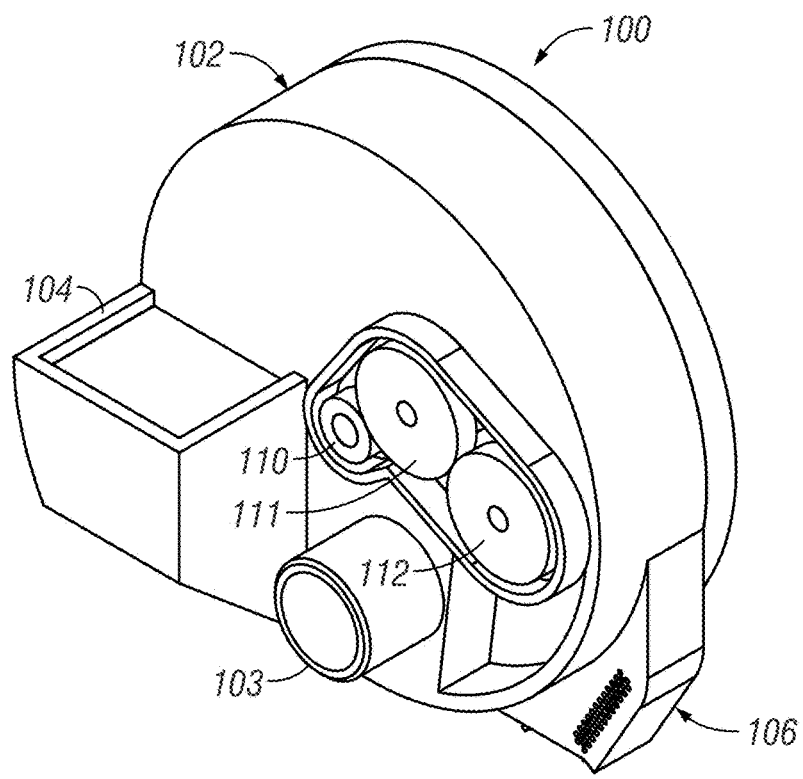
FIG. 21 is a perspective view of the seed meter of FIG. 16.
Figure 22:
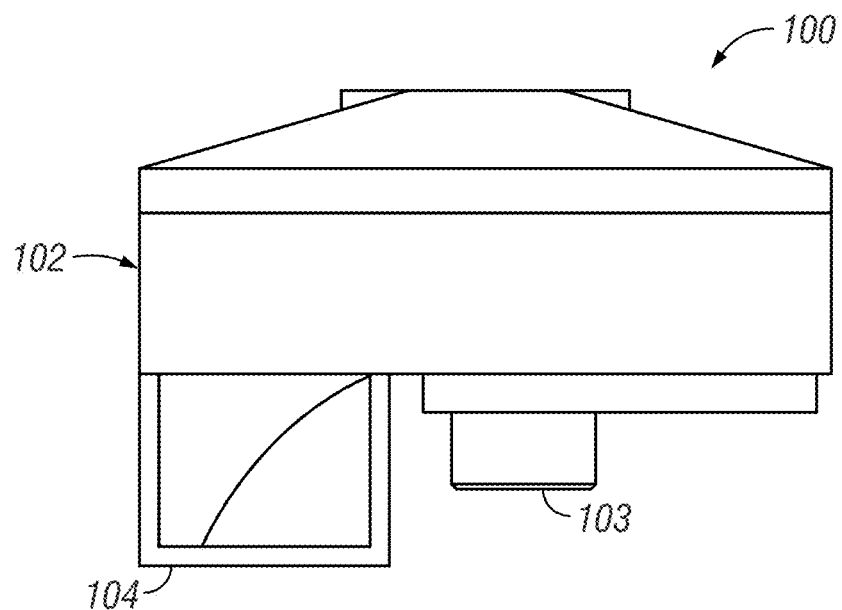
FIG. 22 is a top plan view of the seed meter of FIG. 16.
Figure 23:
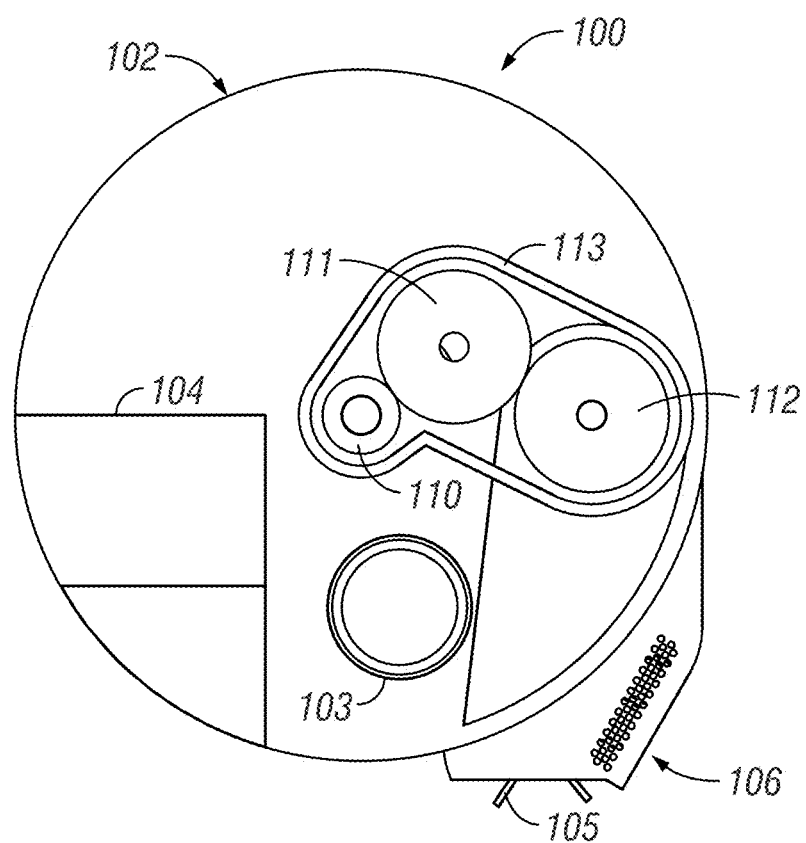
FIG. 23 is a rear view of the seed meter of FIG. 16.
Figure 24:
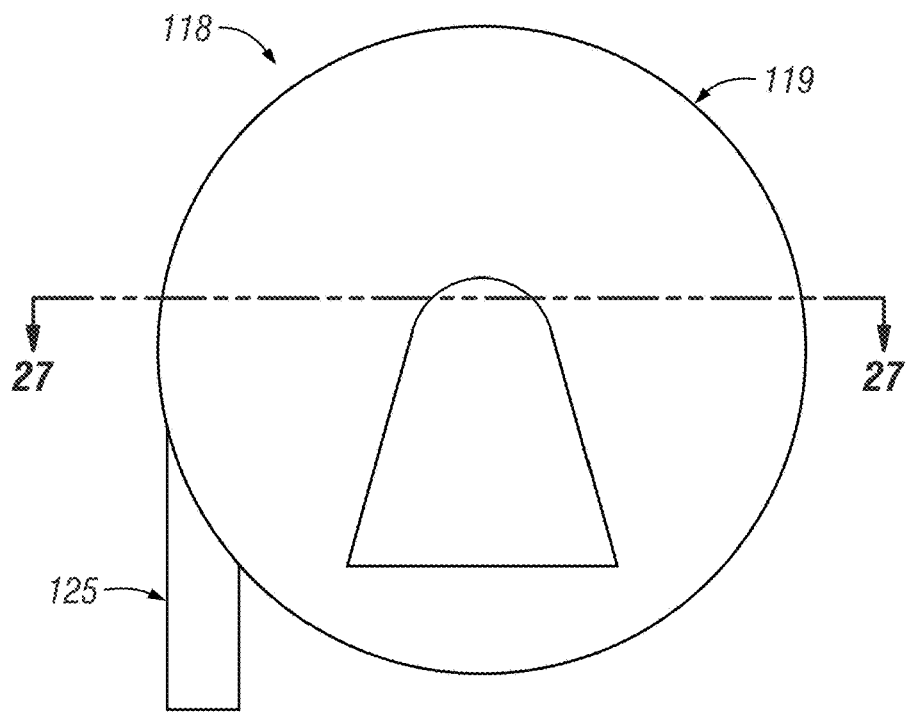
FIG. 24 is a front plan view of another seed meter for use with a row unit according to aspects of the invention.
Figure 25:
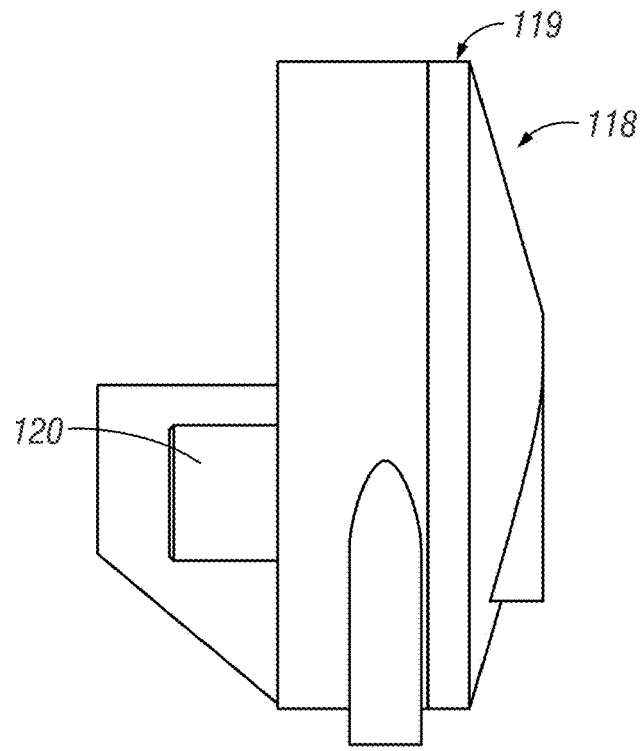
FIG. 25 is a top plan view of the seed meter of FIG. 24.
Figure 26:
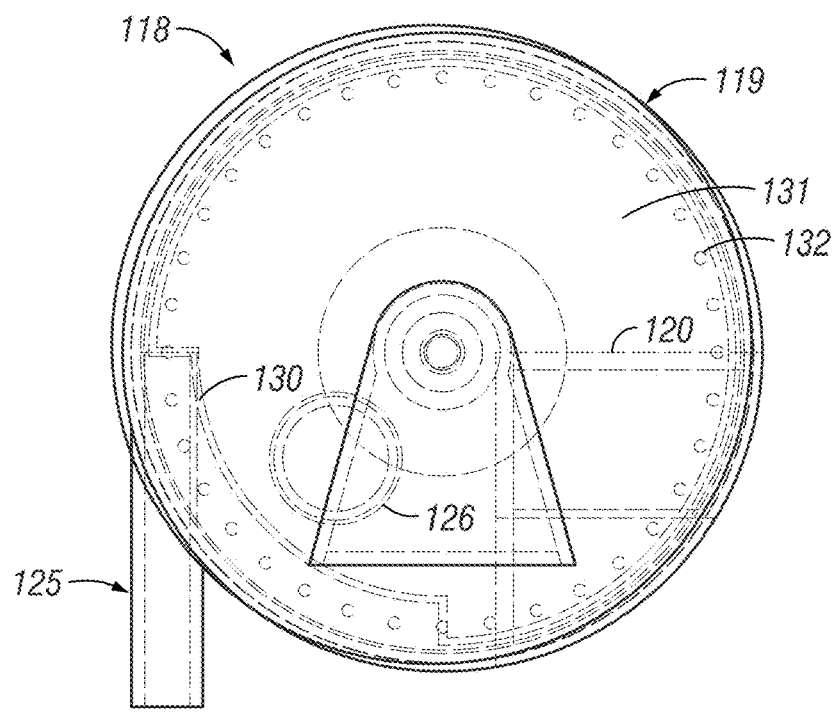
FIG. 26 is a partial see-through of the seed meter of FIG. 24.
Figure 27:
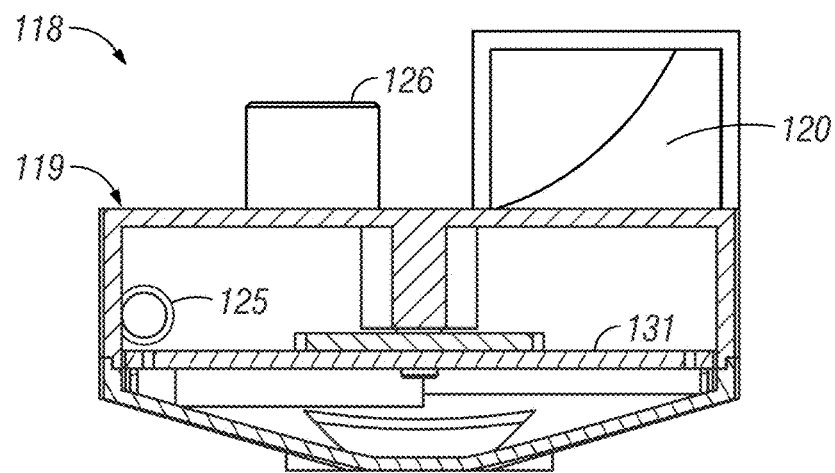
FIG. 27 is a top sectional view of the seed meter of FIG. 24.
Figure 28:
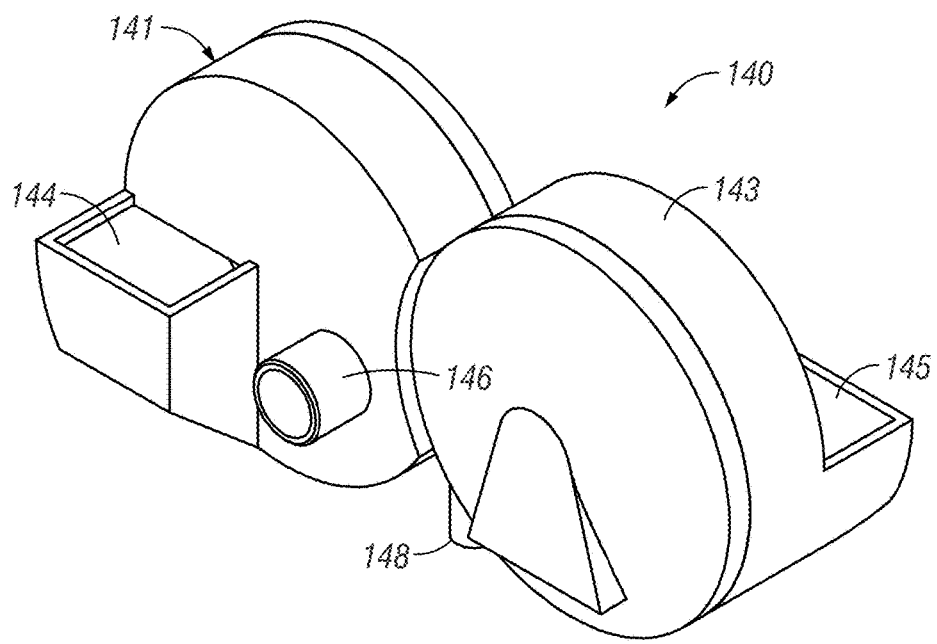
FIG. 28 is a perspective view of a multiple seed meter configuration.
Figure 29:
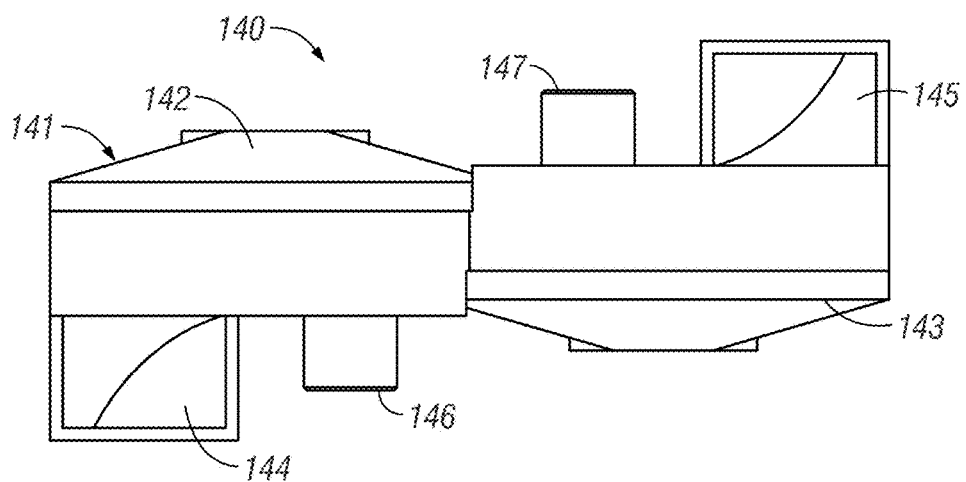
FIG. 29 is a top plan view of FIG. 28.
Figure 30:
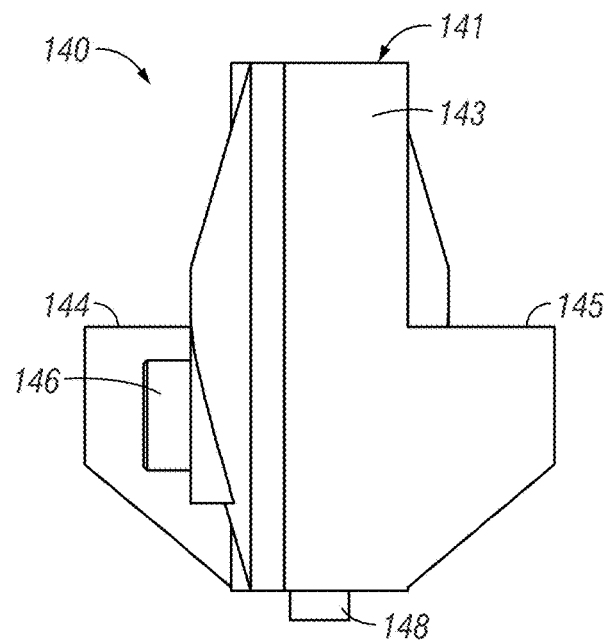
FIG. 30 is a side elevation view of FIG. 28.
Figure 31:
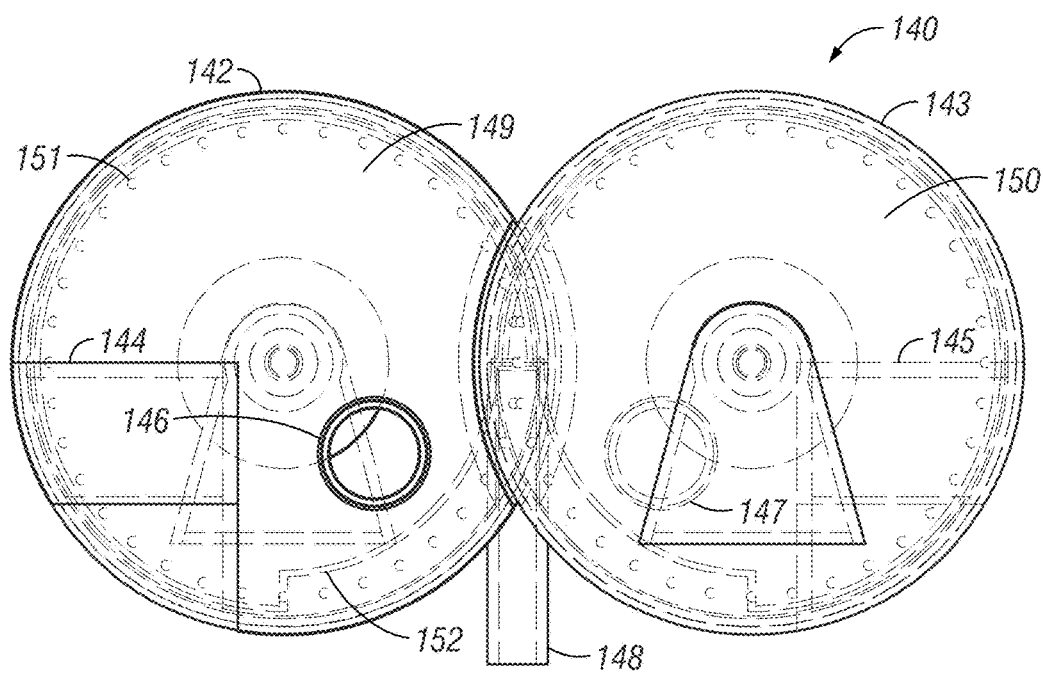
FIG. 31 is a partial see-through of a front elevation view of FIG. 28.
Figure 32:
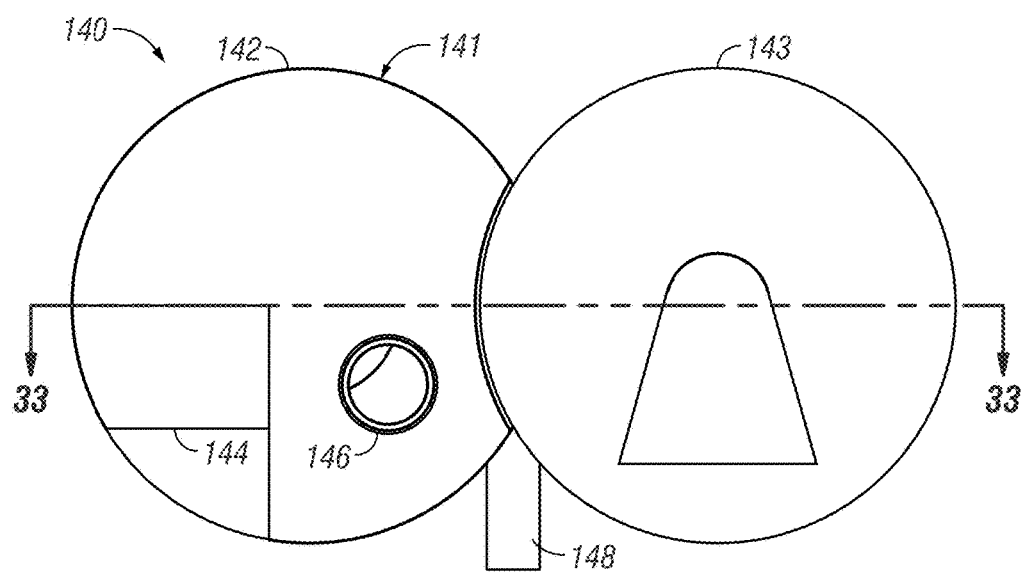
FIG. 32 is a front elevation view of FIG. 28.
Figure 33:
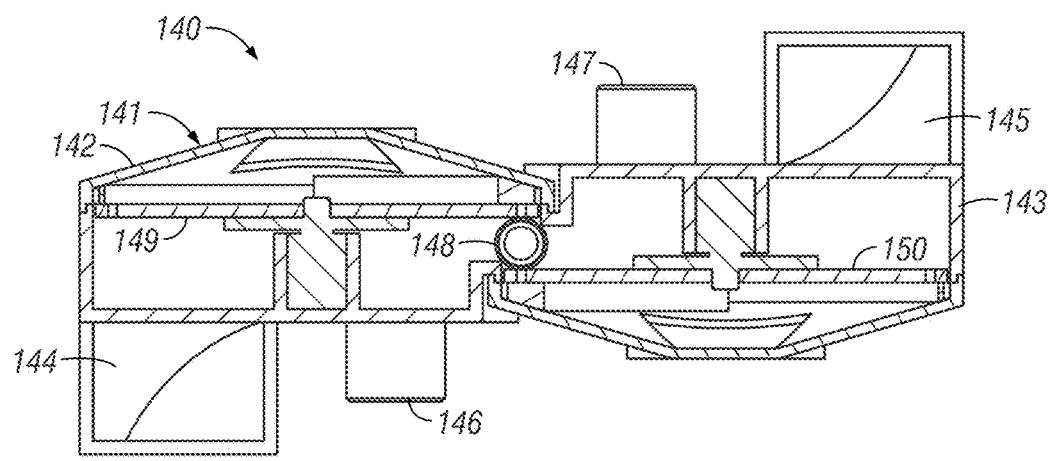
FIG. 33 is atop sectional view of FIG. 32.

FIGS. 14 and 15 disclose variations on the row unit 10. The row unit 10 of includes similar components of that previously shown and described. However, some modifications exist. For example, the ski 26 as previously disclosed has been replaced with gage wheels 96. The gage wheels 96 provide yet another way to control the depth of the furrow being created, for example by controlling the amount of the shank 20 that is allowed to be moved into and through the field. Gage wheels operate by being set, such as by a depth control system, to set a distance between the bottom of the gage wheels and the depth of the furrow to be created. This distance can be equivalent or substantially equivalent to the length of shank 20 extending beyond a bottom of the gage wheels 96. The gage wheels 96 will ride on the field surface, which will aid in maintaining the amount of shank extending below, which will maintain a depth of furrow that is created by the row unit 10. A manual depth control system can include a mechanical linkage that sets the gage wheel location relative to the frame 18 of the row unit 10, which will set the depth of the furrow. This will allow for manual changing of the depth. Still further, an actuator, such as a hydraulic actuator, electric linear actuator, pneumatic actuator, or some combination thereof, can be coupled between the frame 16 and the gage wheels 96 to set the depth of the furrow formed by the shank 20.

The manual adjustment of the gage wheels will provide a set depth that is to be maintained in a field or fields until the system is manually changed by an operator. An actuator can be coupled to an intelligent control, such as a computer processing unit, electrical control unit, and/or a user display of an operator. The intelligent control can provide for automatic adjustment of the gage wheels 96 to set the depth of furrow created, such as by allowing an algorithm to take into account planting, soil, and sensed characteristics in a field to provide for the depth to be created based upon data, such as agronomic data. The intelligent control can also be used to allow an operator to electrically adjust the depth of the furrow, such as by an input to the intelligent control (e.g., via the user display in the tractor, on a phone, on a table, or other computing device in communication with the intelligent control) to manually and electrically change the depth created by adjusting the gage wheels 96. The intelligent control can be positioned on the row unit, on the planter, and/or on the tractor, for controlling such a setup, and can include wired (ISOBUS, Ethernet, coax cables, etc.) and/or wireless (Wi-Fi, Bluetooth, cellular data, microwaves, light, etc.) communication.

FIGS. 16-23 disclose a seed meter 100 that could be used with any of the configurations of the row units as shown and described herein. The seed meter 100 includes a seed meter housing 102. The housing 102 may be one or more components that are used to enclose components of the meter 100, while also providing access points for pressure hookups and seed delivery apparatus/mechanisms. For example, as shown in the figures, the housing may include a pressure hookup 103, which can be used to operatively attach to a vacuum, positive pressure source, or other pressure provider. The positive pressure can be used to hold seed at a disk 108 within the housing 102 for precision planting of the seed planted thereby.

The housing 102 may also include a seed inlet 104, which can be a sort of seed pool 104. The seed pool or inlet 104 can be associated with a seed delivery system, such as an air entrainment system as disclosed in co-owned U.S. Pat. No. 8,448,585, which is hereby incorporated by reference in its entirety. As the air entrainment system uses air, i.e., positive pressure, to deliver the seed to a meter, this could also be used as positive pressure for the seed disk 108.

Also included in a seed chute 106, which includes a seed exit 105. The seed chute 106 can be the location of release of seed from the seed disk 108 such that the seed can be directed towards a seed to ground delivery system, such as a gravity tube or other mechanism. For example, U.S. Ser. No. 14/619,758, which is hereby incorporated by reference in its entirety, discloses multiple seed to ground delivery devices that could be utilized with the present disclosure.

Within the housing 102, a seed disk 108 includes a seed path 109 comprising a plurality of seed apertures for receiving and retaining a seed. The seed disk 108 is rotatable within the housing to move relative to a seed pool, wherein the pressure (positive pressure) will adhere a seed to a seed aperture. The disk 108 will continue rotation, and can pass a singulator to provide for a single seed at each aperture. As disclosed, the positive or negative pressure will create a pressure differential at the seed aperture, which will retain a seed at the aperture of the seed path. This will be maintained as the disk 108 rotates within the housing.

As the disk 108 rotates, a seed at an aperture on the seed path 109 will travel towards the seed chute 106. At or near this location is a guide 107. The guide 107 can work with a mechanism, such as a belt 114, to remove the seed from the disk and move it towards the furrow created in the field. As shown, the belt 114 can be connected be gears 110, 111, and 112, which can control the speed of the belt to control the spacing of the seed delivered via the seed meter 100. A belt or chain can connect the gears to provide the speed. The belt 114 can include flightings 115 and tensioners 116 as well.

In use, the seed is attached to the disk 108, such as via positive pressure. As the seed moves towards the guide 107, the guide 107 and fighting 115 of the belt can create a type of pocket in which the seed can be temporarily housed to remove the seed from the disk 108 and to remove the pressure (either positive or negative). The seed can then be moved via the fighting as it moves through the chute 106 and towards the exit 105 and towards a seed delivery system. If positive pressure is used, any excess positive pressure can be used within the seed chute and/or seed to ground delivery to aid in moving the seed towards the furrow.

Thus, the seed meter 100 will provide for precision planting in the form of seed spacing and delivery of the seed towards the furrow. Additional aspects can include, but are not limited to, a singulator, knock off, or any other part that may aid in the operation of the meter.

FIGS. 24-27 disclose another seed meter 118. The seed meter 118 is similar to that previously disclosed. It includes a housing 119, seed inlet/pool 120, seed chute 125, pressure connection 126, seed disk 131, and seed path 132 comprising a plurality of seed apertures along the seed disk 131.

A guide 130 is also included with the meter 118. However, it will be noted that, in these figures, there is no belt associated with the seed chute 125. Instead, the chute 125 is a tube (see, e.g., FIG. 27). A positive pressure may be used to attach and hold the seed at the seed apertures of the seed path 132. As the disk 131 rotates, it will first pick up seed at the seed pool and then will rotate towards the guide 130. The guide will provide a location where the pressure differential can be nil, which will release the seed from the aperture. This will direct the seed into the seed chute 125 and towards the seed to ground delivery system. As the seed chute is a tube 125, the seed can be directed substantially into the tube during rotation of the disk 131, which will provide for precision release of the seed for precision planting. Still further, the positive pressure of the seed meter 118 can be directed into the chute 125 to further aid in the movement of the seed through the chute and towards the furrow.

Still further, FIGS. 28-33 disclose another assembly of a seed meter 140 in which the assembly comprises multiple seed meters. For example, the meter 140 includes a first seed meter 142 and a second seed meter 143. The seed meters 142 and 143 may comprise any of the configurations of meters as has been disclosed herein.

As shown, the meter 140 includes a housing 141 for housing the meters 142, 143. The housing includes a first seed inlet 144 and a second seed inlet 145, a first pressure connect 146 and a second connect 147. Still further, it is noted that the assembly includes a single seed chute 148, which can receive and direct seed from either of the first seed meter 142 or the second seed meter 143.

Within the housing 141, a first seed disk 149 and a second seed disk 150 are included, and each include seed paths 151. The seed disks 149, 150 are configured to rotate in opposite directions within the housing such that they will both rotate relative to the seed chute 148, which is shown in the form of the tube. Therefore, as the seed is attached to one or both of the disks via positive or negative pressure, the seed will be released at or near the seed chute 148 to be directed towards a seed to ground delivery system for planting in a furrow. When positive pressure is used, any excess positive pressure can be directed into the tube as well to further move the seed. The use of the tubed seed chute will allow the seed to be picked off either of the disks 149, 151 as the respective disk is rotated to be delivered and planted in a precise manner. However, it is to be appreciated that variations and/or the like may be included. For example, a belt could be included to remove seed from the one or more disks during rotation, as included herein.

Furthermore, it should be noted that either or both of the disks can be used at a time. The disks could be associated with different hybrids, varieties, seed types, or other planting particulate such that a single disk is operated (with some overlap as needed) to plant the particulate via the disk. The opposite disk can be operated to plant another particulate. Still further, the disks could be used in conjunction with one another to plant higher populations, plant two particulates in conjunction with one another, or provide additional benefits for planting multiple particulates.

Therefore, an improved row unit has been shown and described. The row unit includes numerous advantages, including the flexibility of different types of seed meters. The seed meters being positioned at a lower location relative to the planter tool bars allows for greater advantages, such as less distance of travel from a seed released from the seed meters. The reduced distance remediate any bounce during movement, and also will provide for greater hand off from the seed meter to the seed delivery system. The seed delivery system can be controlled by individual motors, such as by integrated motors in which the motor is integrated with the wheel itself, in order to provide for greater control of the individual seed delivery systems. This advantageous, especially when turning. Turning compensation for the individual row units provides for numerous advantages over that currently used. For example, during turning at the end of a row or in a curved section of a field, the outer row units will be moving at a different rotational velocity than the inner row unit relative to the angle of curvature. Therefore, the outer row units will need to include seed meters and/or seed delivery systems that are moving more quickly than those at the inner portions of the curve. Having the individual motors integrated into either or both of the seed meters and the seed delivery systems will provide for greater control to allow for the inner rows to be slowed down and the outer rows to be sped up such that the desired spacing between individual seeds is maintained so as to provide for the greatest chance for the seeds to grow in their preferred environment. This includes near equal spacing to give the seeds the best chance for optimal yield. Still other advantages are to be included.

Additional aspects of the invention can be found in co-owned U.S. Ser. No. 15/160,632, which is hereby incorporated by reference in its entirety.

Furthermore, while the row unit has been shown and described with respect to certain elements and/or features, it is to be contemplated that variations may be included. For example, while an electro-mechanical cylinder is utilized, it is contemplated that generally any type of actuator or position cylinder can be utilized, including but not limited to, hydraulic cylinders, pneumatic cylinders, linear actuators, as well as any combination thereof. Furthermore, as has been mentioned, generally any type of seed meter, including but not limited to, positive pressure meters, negative pressure meters, air seed meters, mechanical finger meters, and the like will be included as well as part of the invention. Furthermore, it is contemplated that a multi-hybrid system, such as that shown and described in U.S. application Ser. No. 14/478,222, which is hereby incorporated by reference in its entirety, can be utilized such that the row unit 10 of the invention allow for the planting of one or more varieties of seed as the row unit moves through the field. As is disclosed in the application for multi-hybrid planting, this may include the use of multi-seed meters at the row unit, in which each meter plant a different hybrid of seed. Still further variations that is obvious to those skilled in the art to be considered a part of the invention. The invention includes figures which are shown for exemplary purposes only, and are not to be limiting thereto.

What is claimed is:

1. A row unit for use with an agricultural planting implement, said row unit comprising:
    a shank for creating a furrow in a field;
    a depth setting device in association with the shank for setting the depth of the furrow created by the shank;
    a seed meter comprising one or more metering devices for providing a particulate to be planted via the seed meter; and
    a seed chute for receiving seed from the seed meter including a rotatable belt operatively connected to the seed meter;
    said seed meter being operatively connected to a positive pressure source for providing positive pressure to the meter for metering the particulate, said belt including a guide and flights for creating pockets in which the particulate is temporarily housed and for removing at least some of the positive pressure, and wherein any remaining positive pressure is used to aid in moving the particulate via the seed chute towards the furrow.

2. The row unit of claim 1, wherein the seed meter comprises a single metering device.

3. The row unit of claim 1, wherein the seed meter comprises multiple metering devices.

4. The row unit of claim 1, further comprising a winged member operatively attached to the shank to aid in controlling the depth of furrow created.

5. The row unit of claim 1, further comprising an actuator operatively connected to the shank for providing downforce to the shank.

6. The row unit of claim 1, wherein the depth setting device comprises a ski.

7. The row unit of claim 1, wherein the depth setting device comprises one or more gage wheels.

8. The row unit of claim 1, said seed meter further comprising a seed disk.

9. An agricultural planting implement, comprising:
    a plurality of row units, said row units comprising:
    a furrow opener;
    a depth control for aiding in controlling the depth of the furrow opener; and
    a meter associated with the row unit for metering a particulate for planting by the meter, said meter including one or more disks in a meter housing, one or more pressure connectors for receiving a pressure differential, and a beltless chute for removing particulate from the one or more disks, said chute comprising a wall for removing the particulate from the disk and directing the particulate towards the created furrow and a guide for providing a location where the pressure differential is nil thereby releasing the particulate.

10. The planting implement of claim 9, wherein the pressure comprises positive pressure.

11. The planting implement of claim 10, wherein the positive pressure directs the particulate into the chute.

12. The planting implement of claim 11, wherein the chute comprises a tube for directing the particulate.

13. The planting implement of claim 9, further comprising one or more actuators connected to the furrow opener.

14. The planting implement of claim 9, wherein the meter comprises multiple disks in the meter housing.

15. The planting implement of claim 9, wherein the furrow opener comprises a winged shank.

16. A row unit for use with an agricultural planter, comprising:

a winged shank connected to a depth setting device for creating a furrow in a field of a desired depth;

an actuator connected to the winged shank for providing downforce thereto; and a seed meter operatively connected to the winged shank, said seed meter comprising one or more seed disks within a meter housing for metering one or more seed types, a positive pressure source operatively connected to the housing for providing a pressure at the one or more seed disks, and a seed chute comprising a guide for removing at least some of the pressure and a take-off device for removing seed from the one or more disks and directing the seed towards the furrow created in the field.

17. The row unit of claim 16, wherein the seed chute take-off device comprises a belt.

18. The row unit of claim 16, wherein the seed chute take-off device comprises a seed tube with walls for receiving seed from the one or more seed disks.

* * * * *